United States Patent
Pittman et al.

(10) Patent No.: US 6,741,374 B2
(45) Date of Patent: May 25, 2004

(54) TECHNIQUES FOR PERFORMING LOGIC OPERATIONS USING QUANTUM STATES OF SINGLE PHOTONS

(75) Inventors: Todd B. Pittman, Catonsville, MD (US); James D. Franson, Ellicott City, MD (US); Bryan C. Jacobs, Sykesville, MD (US)

(73) Assignee: The Johns Hopkins University, Baltimore, MD (US)

( * ) Notice: Subject to any disclaimer, the term of this patent is extended or adjusted under 35 U.S.C. 154(b) by 15 days.

(21) Appl. No.: 10/286,735

(22) Filed: Nov. 1, 2002

(65) Prior Publication Data

US 2003/0086138 A1 May 8, 2003

Related U.S. Application Data

(60) Provisional application No. 60/332,837, filed on Nov. 6, 2001, and provisional application No. 60/414,964, filed on Sep. 30, 2002.

(51) Int. Cl.[7] .................................................. G02F 3/00
(52) U.S. Cl. ..................... 359/108; 359/107; 708/191
(58) Field of Search ................................. 359/107, 108; 708/191, 816, 831

(56) References Cited

U.S. PATENT DOCUMENTS

| | | | | |
|---|---|---|---|---|
| 5,838,436 | A | 11/1998 | Hotaling et al. | 356/345 |
| 5,917,322 | A | 6/1999 | Gershenfeld et al. | 324/307 |
| 6,128,764 | A | 10/2000 | Gottesman | 714/785 |
| 6,218,832 | B1 | 4/2001 | Chuang et al. | 324/300 |
| 6,437,413 | B1 | 8/2002 | Yamaguchi et al. | 257/421 |
| 2002/0140941 | A1 * | 10/2002 | Pedigo | 356/450 |
| 2003/0133714 | A1 * | 7/2003 | Gat | 398/140 |

FOREIGN PATENT DOCUMENTS

GB 2378319 * 2/2003 ............ H01L/33/00

OTHER PUBLICATIONS

D. Deutsch, et al, in "Quantum Computation", published in Physics World, Mar. 1998.

A. Ekert, et al, in "Basic Concepts and Quantum Computation" published by the *Center for Quantum Computation*, University of Oxford, Jan. 16, 2000.

"Simple Scheme for Efficient Linear Optics Quantum Gates", by TC Ralph et al., Physical Rev. A, vol. 65, pp. 012314 1–6.

"A Scheme for Efficient Quantum Computation with Linear Optics", by E Knill et al., Nature, vol. 409, pp. 46–52

"Quantum Logic Gates in Optical Lattices", by GK Brennen et al., Physical Rev. Ltr., vol. 82, #5, pp. 2060–0631.

"Quantum Gates with "Hot" Trapped Ions", by JF Pyyatos et al., Physical Rev. Ltr., vol. 81, #6, pp. 1322–1325.

(List continued on next page.)

*Primary Examiner*—Drew Dunn
*Assistant Examiner*—Leo Boutsikaris
(74) *Attorney, Agent, or Firm*—Francis A. Cooch

(57) ABSTRACT

A method and apparatus for performing logic operations using quantum polarization states of single photons, include a first polarizing beam splitter having first input spatial modes and first output spatial modes for a first set of orthogonal polarizations. A second polarizing beam splitter has a second input spatial mode and second output spatial modes for a second set of orthogonal polarizations. The second set of orthogonal polarizations is different from the first set. The second input spatial mode is aligned with a first detected output spatial mode. A single photon detector of multiple single photon detectors is disposed along each one of the second output spatial modes. A first device output carries an output photon based in part on a number of photons detected by the single photon detectors. Such logic operations may be used in quantum computers for quantum information processing.

37 Claims, 13 Drawing Sheets

OTHER PUBLICATIONS

"Ideal Quantum Communication over Noisy Channels: A Quantum Optical Implementation", by SJ van Enk et al., Physical Rev. Ltr., vol. 78, #22, pp. 4293–4296.

"Measurement of Conditional Phase Shifts for Quantum Logic", by QA Turchette, Physical Rev. Ltr., vol. 75, #25, pp. 4710–4713.

"Realizable Universal Quantum Logic Gates", by T Sleator et al., Physical Rev. Ltr., vol. 74, #20, pp. 4087–4090.

"Quantum Computations with Cold Trapped Ions", by JI Cirac et al., Physical Rev. Ltr., vol. 74, #20, pp. 4091–4094.

* cited by examiner

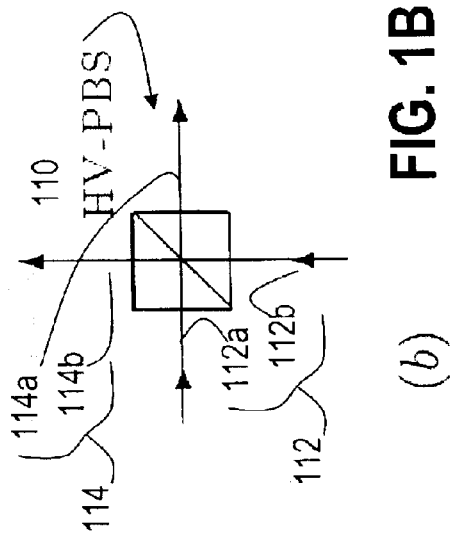
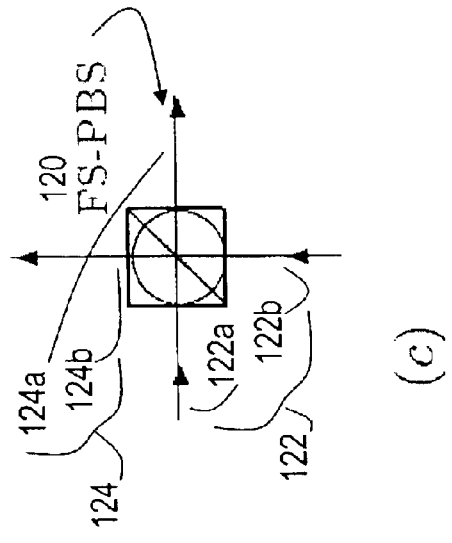
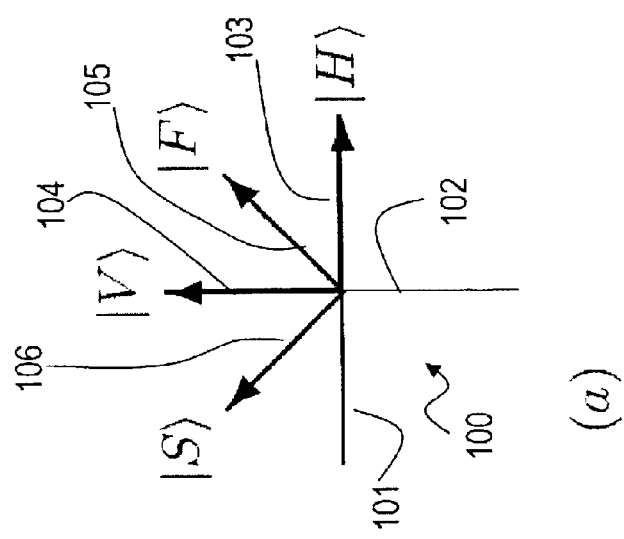
FIG. 1A
FIG. 1B
FIG. 1C

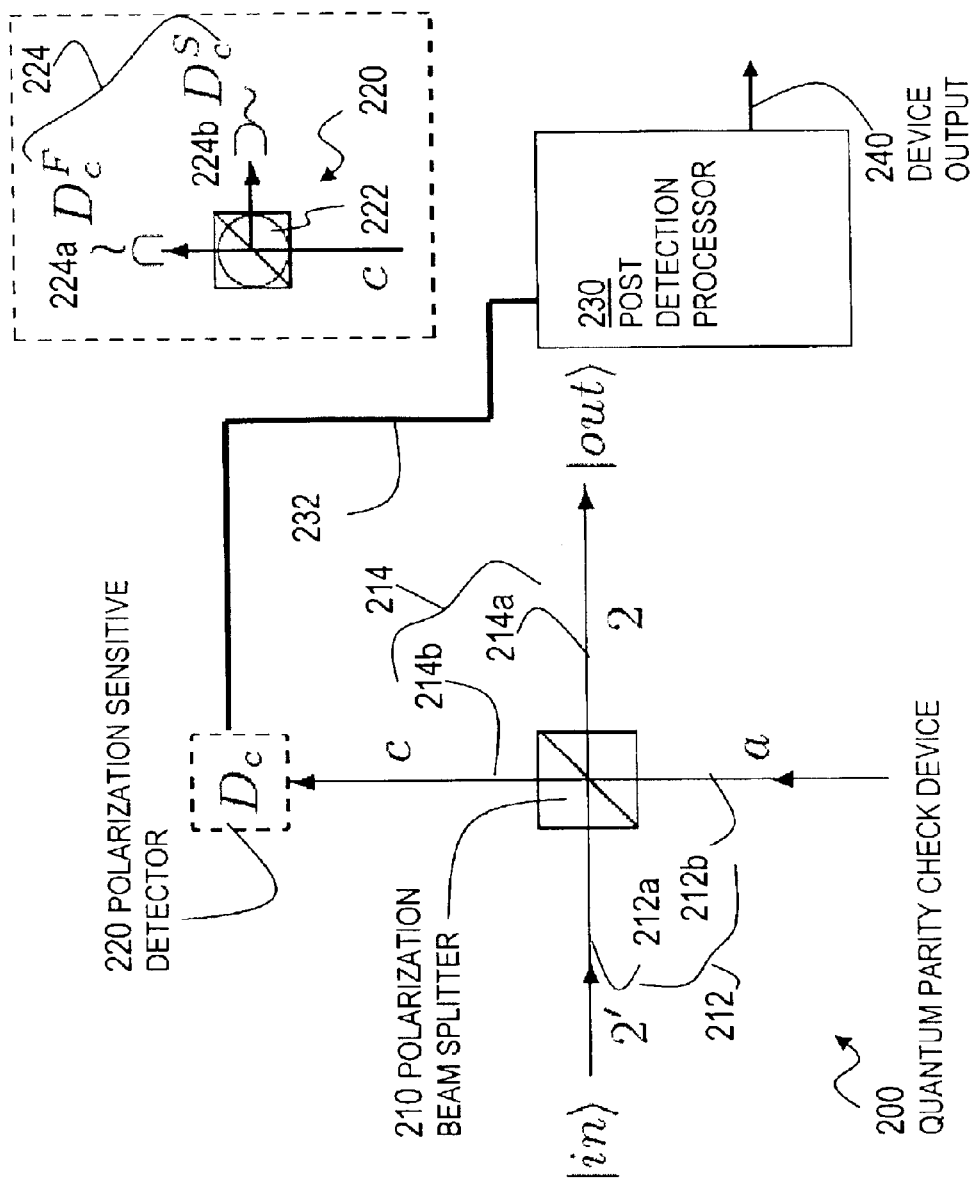

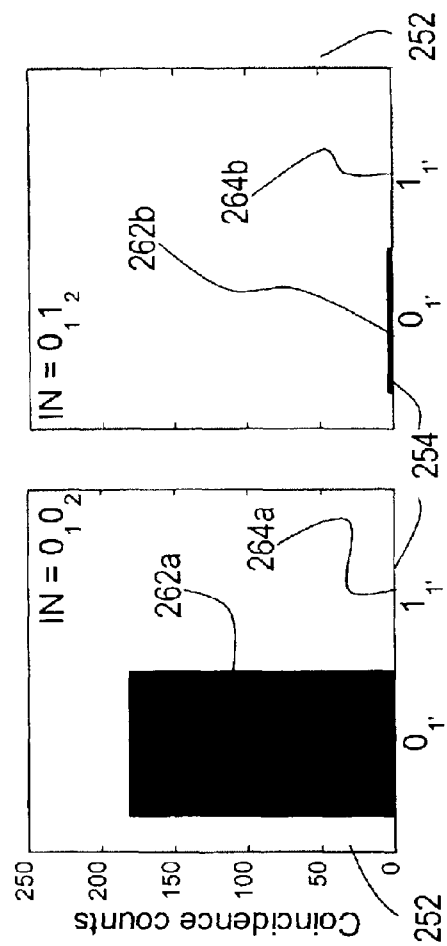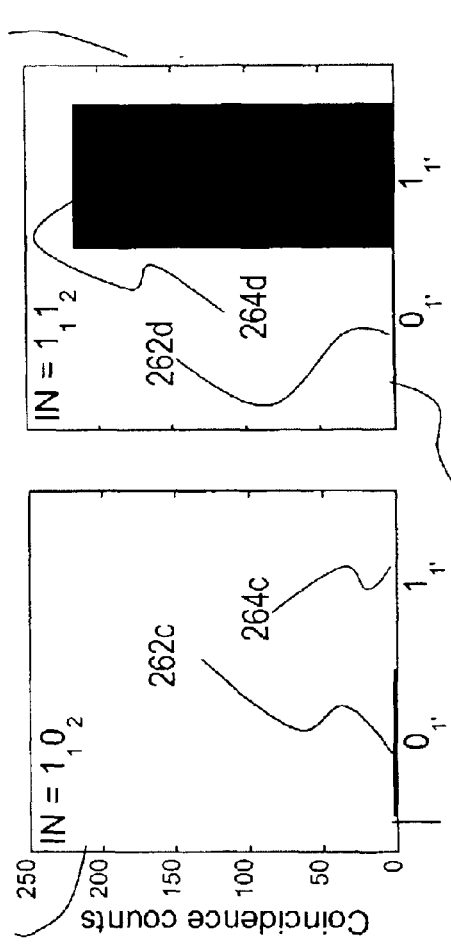

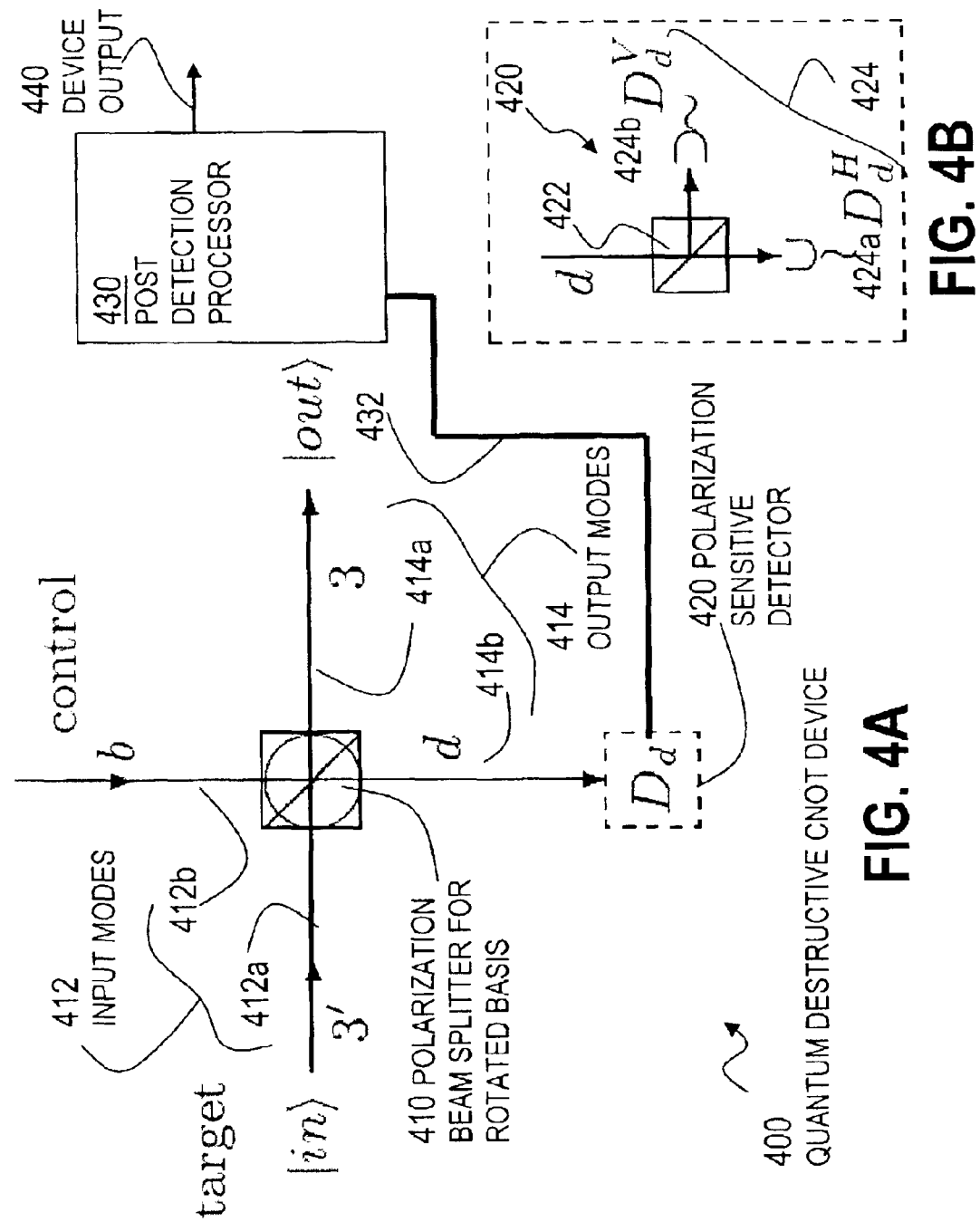

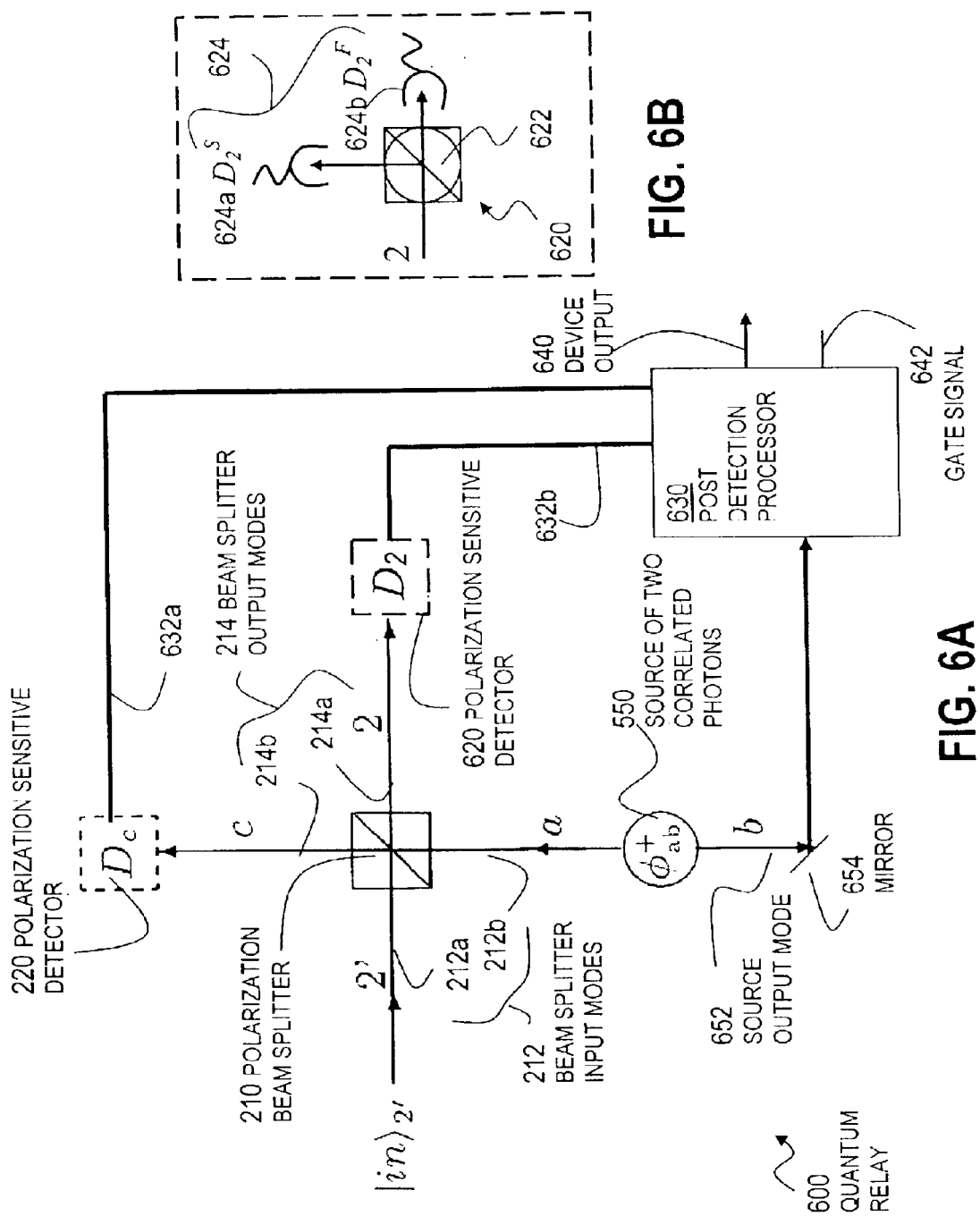

TECHNIQUES FOR PERFORMING LOGIC OPERATIONS USING QUANTUM STATES OF SINGLE PHOTONS

CROSS-REFERENCE TO RELATED APPLICATIONS

This application claims benefit of Provisional Appln. No. 60/332,837, filed Nov. 6, 2001, and of Provisional Appln. No. 60/414,964, filed Sep. 30, 2002, the entire contents of each application being hereby incorporated by reference as if fully set forth herein, under 35 U.S.C. §119(e).

STATEMENT OF GOVERNMENTAL INTEREST

This invention was made partially with Government support under Contract No. N0001491J1485 awarded by the Office of Naval Research. The Government has certain rights in the invention.

BACKGROUND OF THE INVENTION

1. Field of the Invention

The present invention relates to quantum information processing, and, in particular, to techniques for performing logic operations using quantum states of single photons.

2. Description of the Related Art

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

Information processing using classical computers relies on physical phenomena, such as magnetic fields, voltages, and optical intensity that can be produced and measured in each of two base states, one base state representing a zero and another base state representing a one. Each physical element that can achieve either of these two states represents one binary digit, called a bit. Quantum information processing uses physical elements that exhibit quantum properties that may include, not only one of the two or more base states, but also an arbitrary superposition state of the base states. A superposition state has some non-zero probability of being measured as one of the base states and some non-zero probability of being measured as another of the base states. A physical element that exhibits quantum properties for two base states represents one quantum bit, also called a qubit. Physical elements that are suitable for representing qubits include the spins of single electrons, electron states in atoms or molecules, nuclear spins in molecules and solids, magnetic flux, spatial propagation modes of single photons, and polarizations of single photons.

Logical operations performed on qubits apply not only to the base states of those qubits but also to the superposition states of those qubits, simultaneously. Quantum computers based on logical operations on systems of qubits offer the promise of massively simultaneous processing (also called massively parallel processing) that can address problems that are considered intractable with classical information processing. Such classically intractable problems that can be addressed with quantum computers include simulation of quantum interactions, combinatorial searches in unsorted data, finding prime factors of large integers, solving for cryptographic keys used in current secure communication algorithms, and truly secure communications (also called "quantum cryptography").

Obstacles to achieving quantum computers include the difficulty in isolating qubits from uncontrolled interactions with the environment and transmitting qubits. Many of the physical elements that represent qubits, such as molecules and solids, are not readily transmitted and interact strongly with their environment.

Single photons, however, interact little in many environments, including glass fiber and air, and are easily transmitted in such media. Therefore several approaches have utilized quantum properties of single photons.

One approach implements logical operations on single photons using non-linear interactions between single photons. A problem with non-linear interactions between single photons is that such interactions are very weak and no devices satisfactorily implement this approach.

Another approach uses linear interactions between single photons but relies on interferometer techniques, e.g., interference on two spatial modes of propagation for a single photon. For example, logic gates using this approach have been proposed by E. Knill, R. Laflamme, and G. J. Milburn, "A scheme for efficient quantum computation with linear optics," *Nature*, vol. 409, p. 49, Jan. 4, 2001 (hereinafter Knill) and by M. Koashi, T. Yamamoto, and N. Imoto, "Probabilistic manipulation of entangled photons," *Physical Review* A, vol. 63, 030301, Feb. 12, 2001 (hereinafter Koashi). These devices are called "probabilistic" logical gates because they perform the desired logical operation in response to only a fraction of the input photons. However, it can be determined when an operation is performed successfully, so that, in a separate step often called a "post selection" step or a "post-detection selection" step, output photons are blocked unless the operation is successfully performed. It has been shown that the fraction can be increased close to a value of one with sufficient numbers of components and extra photons (called "ancilla") in particular states.

Probabilistic, linear devices proposed by Knill suffer from errors due to thermally induced phase shifts on the two spatial modes. Other probabilistic, linear devices proposed by Koashi reduce the phase shifts by including a large number of additional components and other resources, such as sources of a large number of qubits in particular states.

Based on the foregoing, there is a clear need for devices that perform logical operations on quantum states of single photons that do not suffer the disadvantages described above. In particular, there is a clear need for logical devices that operate on the polarization states of single photons that do not suffer thermally induced phase shifts and that do not require a large number of additional components and resources.

SUMMARY OF THE INVENTION

Techniques are provided for using quantum polarization states of single photons to perform logical operations. In one aspect of the invention, a logic device includes a first polarizing beam splitter that has first input spatial modes and first output spatial modes for a first set of orthogonal polarizations. A second polarizing beam splitter has a second input spatial mode and second output spatial modes for a second set of orthogonal polarizations different from the first set. The second input spatial mode is aligned with a detected output spatial mode of the first output spatial modes. Each single photon detector of multiple single photon detectors is disposed along a different one of the second output spatial modes from the second polarizing beam splitter. A first device output carries an output photon based in part on a number of photons detected by the single photon detectors. A polarizing beam splitter for a particular set of orthogonal polarizations transmits a photon that arrives on a particular input spatial mode with one polarization of the particular set onto one output spatial mode, and transmits a photon that arrives on the particular input spatial mode with a different polarization of the particular set onto a different output spatial mode.

The logic device is probabilistic, providing the correct output but only producing an output a fraction of the time. The fraction can be increased using post-detection operations that are based on which single photon detectors make detections. The fraction can be further increased using additional photon sources or linear components or both. By using beam splitters with different sets of orthogonal polarizations, photon polarization states associated with qubits are not measured during the detections of single photons, and photon state coherence is maintained during operation by the logic device.

In other aspects of the invention, a method of performing logic operations and a method of fabricating a logic device are presented.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a graph that illustrates the relationship between different sets of orthogonal polarization states, according to an embodiment;

FIG. 1B is a block diagram that illustrates a polarizing beam splitter using a first set of orthogonal polarization states;

FIG. 1C is a block diagram that illustrates a polarizing beam splitter using a second set of orthogonal polarization states;

FIG. 2A is a block diagram that illustrates a quantum parity check device, according to an embodiment;

FIG. 2B is a block diagram that illustrates a polarization sensitive photon detector used in the quantum parity check device of FIG. 2A, according to an embodiment;

FIGS. 2C, 2D, 2E, 2F are graphs that illustrate experimental results that indicate the performance of the quantum parity check device of FIG. 2A operating on non-superposition states;

FIG. 4A is a block diagram that illustrates a quantum destructive CNOT device, according to an embodiment;

FIG. 4B is a block diagram that illustrates a polarization sensitive photon detector used in the quantum destructive CNOT device of FIG. 4A, according to an embodiment;

FIG. 6A is a block diagram that illustrates a quantum relay, according to an embodiment;

FIG. 6B is a block diagram that illustrates a polarization sensitive photon detector used in the quantum relay of FIG. 6A, according to an embodiment;

DETAILED DESCRIPTION

Figure 2G:
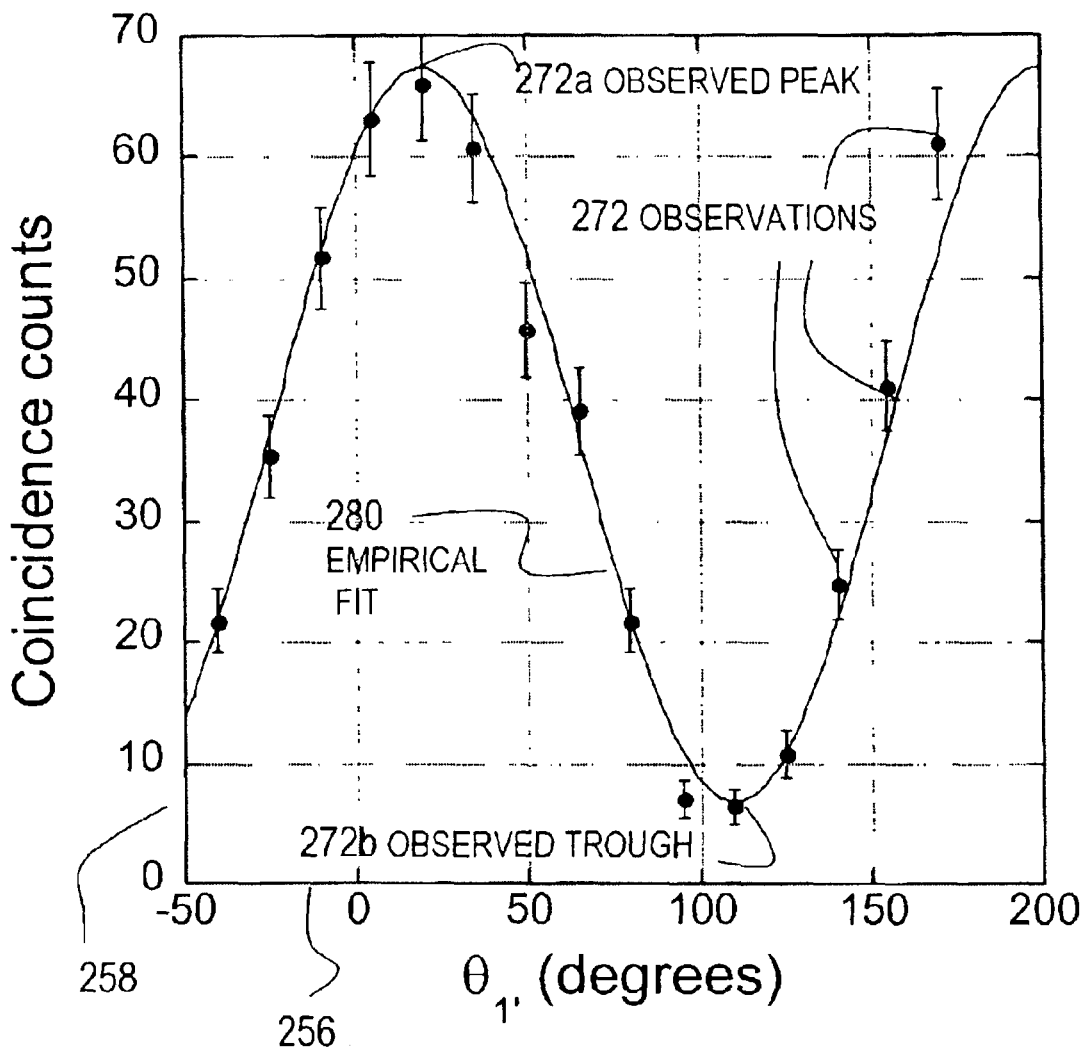
FIG. 2G is a graph that illustrates experimental results that indicate the performance of the quantum parity check device of FIG. 2A operating on a superposition state.

A method and apparatus for using quantum polarization states of single photons to perform logical operations is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. Operational Context

The present invention is described in the following using particular polarization states of the single photons designated horizontal (H) and vertical (V). In other embodiments other polarization states may be utilized. Also, in the following, beam splitters with two perpendicular input spatial modes and two perpendicular output spatial modes are described. In other embodiments, other polarizing beam splitters with different spatial modes and more spatial modes may be utilized.

FIG. 1A is a graph 100 that illustrates the relationship between different sets of orthogonal polarization states, according to the illustrated embodiments. In a plane perpendicular to the direction of propagation of a photon, one direction of polarization is designated H and the perpendicular direction of polarization is designated V. The plane perpendicular to the direction of propagation of a photon is represented by the horizontal axis 101 and the vertical axis 102. A vector 103 of magnitude one directed along the positive horizontal axis represents the horizontal polarization base state, designated H. A vector 104 of magnitude one directed along the positive vertical axis represents the vertical polarization base state, designated V. These two orthogonal polarizations represent the two base states of polarization for a qubit. A photon can simultaneously be in a state, ψ, represented by the complex superposition of these two base states, as given by Equation 1.

$$\psi = \alpha H + \beta V \quad (1)$$

where α and β are complex numbers that include a real part and an orthogonal imaginary part. As is well known in the art of quantum information processing, the magnitude of $\alpha^2$ indicates the probability that a photon will be measured as horizontally polarized and the magnitude of $\beta^2$ indicates the probability that the photon will be measured as vertically polarized. The sum is one, as indicated by Equation 2.

$$|\alpha^2| + |\beta^2| = 1 \quad (2)$$

A photon source that produces photons that are always measured with horizontal polarization produces photons in the state 1 H+0 V, and a source that produces photons that are always measured with vertical polarization produces photons in the state 0 H+1 V.

It is a well-known, but non-intuitive, property of quantum states that measuring the state of one photon of several correlated photons changes the state of the unmeasured correlated photons. This is similar to the way that measuring the occurrence of one event that is correlated with the occurrence of a second event changes the probability of occurrence of the second event. This effect is said to decrease the coherence in the state of the photons operated upon. For a quantum logic device to be more useful in a quantum computer that may connect several devices together in a quantum network, it is preferable that the coherence of the state of a photon being operated upon is not decreased in a logic device.

FIG. 1A also depicts two different orthogonal polarizations rotated 45 degrees relative to the base states H, V in the plane perpendicular to the direction of propagation of a photon, which are herein designated F and S, respectively. A vector 105 of magnitude one directed 45 degrees above the positive horizontal axis represents F. A vector 106 of magnitude one directed 45 degrees past the positive vertical axis represents S.

FIG. 1B is a block diagram that illustrates a polarizing beam splitter 110 relative to the set of orthogonal polarizations coincident with states H, V (called hereinafter an "H-V PBS"). The illustrated beam splitter 110 has two input modes 112, including modes 112a, 112b, that represent directions of propagation of photons that impinge on the beam splitter 110 and two output modes 114, including modes 114a, 114b, that represent directions of propagation of photons that leave the beam splitter 110. A polarizing beam splitter for a particular set of orthogonal polarizations transmits a photon that arrives on a particular input spatial mode with one polarization of the particular set onto one output spatial mode, and transmits a photon that arrives on the particular input spatial mode with a different polarization of the particular set onto a different output spatial mode.

In the illustrated embodiments, a photon in spatial mode 112a with state 1 H+0 V is emitted into output mode 114a; and a photon in spatial mode 112a with state 0 H+1 V is emitted into output mode 114b. In the illustrated embodiments, mode 114a is aligned with mode 112a while mode 114b is perpendicular to mode 112a, so that output mode 114a is considered to be a transmission output mode and output mode 114b is considered to be a reflection output mode, with respect to input mode 112a. Thus, in the illustrated embodiments, a photon in spatial mode 112a with state 1 H+0 V is emitted into transmission output mode 114a, and a photon in spatial mode 112a with state 0 H+1 V is emitted into reflection output mode 114b. In other embodiments, a photon in spatial mode 112a with state 1 H+0 V is emitted into reflection output mode 114b and a photon in spatial mode 112a with state 0 H+1 V is emitted into transmission output mode 114a. Similarly, in the illustrated embodiment, a photon in spatial mode 112b with state 1 H+0 V is emitted into transmission output mode 114b; and a photon in spatial mode 112b with state 0 H+1 V is emitted into reflection output mode 114a. A photon with a superposition of states is emitted onto one mode with one probability and emitted onto a different mode (e.g., reflected) with another probability.

H-V PBSs that transmit one base state with near 100% efficiency and reflect the orthogonal state with near 100% efficiency are well known in the art.

FIG. 1C is a block diagram that illustrates a polarizing beam splitter 120 relative to the second set of orthogonal polarizations F, S (called hereinafter an "F-S PBS"). The illustrated beam splitter 120 has two input modes 122, including input modes 122a, 122b and two output modes 114, including output modes 114a, 114b.

In the illustrated embodiments, a photon in spatial mode 122a with polarization F is emitted into output mode 124a; and a photon in spatial mode 122a with polarization S is emitted into output mode 124b. In the illustrated embodiments, mode 124a is aligned with mode 122a while mode 124b is perpendicular to mode 122a, so that output mode 124a is considered to be a transmission output mode and output mode 124b is considered to be a reflection output mode with respect to input mode 122a. Thus, in the illustrated embodiments, a photon in spatial mode 122a with F polarization is emitted into transmission output mode 124a a photon in spatial mode 122a with S polarization is emitted into reflection output mode 124b. In other embodiments, a photon in spatial mode 122a with S polarization is emitted into reflection output mode 124b.

Similarly, in the illustrated embodiments, a photon in input spatial mode 122b with F polarization is emitted into transmission output mode 124b; and a photon in input spatial mode 122b with S polarization is emitted into reflection output mode 124a.

F-S PBSs that transmit one base state with near 100% efficiency and reflect the orthogonal state with near 100% efficiency are well known in the art. Such a device can be implemented, for example, by rotating the H-V PBS by 45 degrees or by rotating the polarization of a photon through 45 degrees before directing the photon onto an H-V PBS.

2. Quantum Parity Check Device 2.1 Quantum Parity Check Device Structural Overview FIG. 2A is a block diagram that illustrates a quantum parity check device 200, according to an embodiment. The function of a quantum parity check for a pure 0 state or pure 1 state is to transfer the value of an input qubit to an output qubit provided that the value of the input qubit is the same as that of a second input qubit (a "check" qubit). No photon is output if the states differ. For example, as is shown below, the quantum parity check device 200 produces an output photon with the same state as an input photon when the input photon is in the same state as a second input, "check" photon. No measurement of the input qubit value or the check qubit value is obtained. The parity check operation can be generalized to apply to superposition states, as described below.

The parity check device 200 includes an H-V PBS 210, like the one depicted in FIG. 1B. The H-V PBS 210 has input spatial modes 212 including input mode 212a (also labeled mode "2'" in FIG. 2A) and a check mode 212b (also labeled mode "a" in FIG. 2A). The H-V PBS 210 has output spatial modes 214 including a transmitted output mode 214a (also labeled mode "2" in FIG. 2A) and a detected output mode 214b (also labeled mode "c" in FIG. 2A). For purposes of illustration, it is assumed that the spatial modes depicted in FIG. 2A are in the horizontal plane as viewed from above.

The parity check device 200 also includes a polarization sensitive detector 220 (also labeled "Dc") that detects a number of single photons on detected output mode 214b.

The parity check device 200 also includes a post-detection processor 230 with a device output 240. Classical information about photons detected in detector 220 is sent over classical data link 232 to a post-detection processor 230. The post-detection processor may include one or more classical information processing elements. The transmitted output mode 214a also enters the post-detection processor, where it may be blocked or transformed or transmitted unchanged to the device output 240.

2.2 Quantum Parity Check Operation

An input photon arrives on mode 212a and a check photon arrives on mode 212b. The photons are assumed to arrive simultaneously, i.e., both photons arrive during a time interval short compared to a time interval during which either photon interacts with the beam splitter 210.

A photon output on transmitted mode 214a is accepted and transferred to device output 240 only for those cases in which polarization sensitive detector 220 receives one and only one ("1AO1") photon. This can only occur if the target and check photons have the same polarization. For example, if the input photon and the check photon are both in the H state in the illustrated embodiment, both will be transmitted straight through the PBS, and only the check photon will strike detector 220. If the input photon and the check photon are both in the V state in the illustrated embodiment, both will be reflected, and only the input photon will strike detector 220. If the input is in the H state and the check photon is in the V state, the input will be transmitted onto output mode 214a and the check photon will be reflected onto the same output mode 214a. No photon will be transmitted over the detected output mode 214b and strike detector 220. If the input is in the V state and the check photon is in the H state, the input will be reflected onto detected output mode 214b and the check photon will be transmitted onto the same detected output mode 214b. Two photons will be transmitted over the detected output mode 214b and strike detector 220.

The detector 220 must distinguish between the arrival of zero, one and two photons without indicating the H-V state of the detected photons. Therefore the detector 220 should not provide the H-V state of the photons detected.

FIG. 2B is a block diagram that illustrates a polarization sensitive photon detector 220 used in the quantum parity check device 200, according to an embodiment. This detector has the desirable property of distinguishing between zero, one and two photons without measuring the H-V state of the photons detected.

Polarization sensitive detector 220 includes a F-S PBS 222, like the F-S PBS illustrated in FIG. 1C, and two single photon detectors 224. Any single photon detector known in the art may be used for each of the two single photon detectors in this and subsequent figures. For purposes of illustration, it is assumed that a single photon detector outputs a signal comprising a classical bit that is 0 when no photon is detected and 1 when a photon is detected.

The input mode of F-S PBS 222 is aligned to receive the photons output onto detected output mode 214b (also labeled "c" in FIG. 2A and FIG. 2B). In the illustrated embodiment, an F polarized photon emitted by F-S PBS 222 on a transmitted output mode is detected by single photon detector 224a (represented by the symbol "$Dc^F$"); and an S polarized photon emitted by F-S PBS 222 on a reflected output mode is detected by single photon detector 224b (represented by the symbol "$Dc^S$").

Because an F polarized photon is an equal superposition of H and V polarizations, for example, a measurement of an F polarized photon provides no information regarding the original H-V states of the input and check photons. The use of the F-S PBS 220 is said to "erase" any H-V information in the detected photons that pass through the H-V PBS 210, and thus preserves the coherence of the photons operated upon by the device 200.

To show the probabilistic effects of a superposition of states on the quantum parity check device, it is assumed for purposes of illustration that the input photon has an arbitrary polarization state $\Psi in$ given by Equation 3a and the check photon has the particular state $\Psi a$ given by Equation 3b. Though theoretical descriptions are here provided to help understand the operations of this and subsequent logic devices, the embodiments are not limited to these particular theoretical descriptions.

$$\Psi in = \alpha Hin + \beta Vin \quad (3a)$$

$$\Psi a = (Ha + Va)/\sqrt{2} \quad (3b)$$

The total input state $\Psi in,a$ at the H-V PBS is given by the vector cross product of these two states, as is well known in the art. The output state $\Psi out,c$ of the two photons from the H-V PBS beam splitter on the transmitted mode 214a ("out") and detected mode 214b ("c") is given by Equation 3c.

$$\Psi out,c = (\alpha Hout Hc + \beta Vout Vc + \alpha Hout Vout + \beta Hc Vc)/\sqrt{2} \quad (3c)$$

The last two terms correspond to output states $\Psi fail$ that lead to two or zero photons at detector 220, which are blocked in post detection processor 230. The state of the photon transmitted on detected mode 214b, written in terms of the F-S polarizations, Fc, Sc, respectively, is given by Equation 3d.

$$\Psi c = [(\alpha Hout + \beta Vout)Fc + (-\alpha Hout + \beta Vout)Sc]/2 + (\Psi fail)/\sqrt{2} \quad (3d)$$

The Fc term indicates that when 1AO1 photon is detected in detector $Dc^F$ 224a and no photons are detected in detector $Dc^S$ 224b, the arbitrary polarization of the input photon ($\alpha Hin + \beta Vin$) on mode 212a is mapped onto the photon in mode 214a ($\alpha Hout + \beta Vout$). This occurs with a probability of ¼. The Sc term indicates that when 1AO1 photon is detected in detector $Dc^S$ 224b and no photons are detected in detector $Dc^F$ 224a, the arbitrary polarization of the input photon ($\alpha Hin + \beta Vin$) on mode 212a is mapped onto a 180 degree ($\pi$ radians) phase-shifted photon in mode 214a ($-\alpha Hout + \beta Vout$). This also occurs with a probability of ¼.

According to one embodiment, the post-detection processor 230 passes a photon on output mode 214a to device output 240 only when one photon is detected in detector $Dc^F$ 224a and no photons are detected in detector $Dc^S$ 224b. This embodiment succeeds with a probability of ¼. According to another embodiment, in addition to passing a photon on output mode 214a to device output 240 when one photon is detected in detector $Dc^F$ 224a and no photons are detected in detector $Dc^S$ 224b, the post-detection processor 230 also phase shifts the photon on output mode 214 by 180 degrees and passes the phase-shifted photon to device output 240 when one photon is detected in detector $Dc^S$ 224b and no photons are detected in detector $Dc^F$ 224a. This embodiment succeeds with a probability of ½. Any method known in the art may be used for imparting a 180-degree phase shift. For example, the bias voltage on a Pockel's cell can be changed rapidly upon detection of a photon in detector $Dc^S$ 224b.

It is noted that accepting either of the two 1AO1 detections does not provide any type of H-V polarization information that would essentially serve to measure the state of the input photons on input modes 212 and decrease the coherence of the photons being operated upon.

2.3 Parity Check Experimental Results

Figure 3:
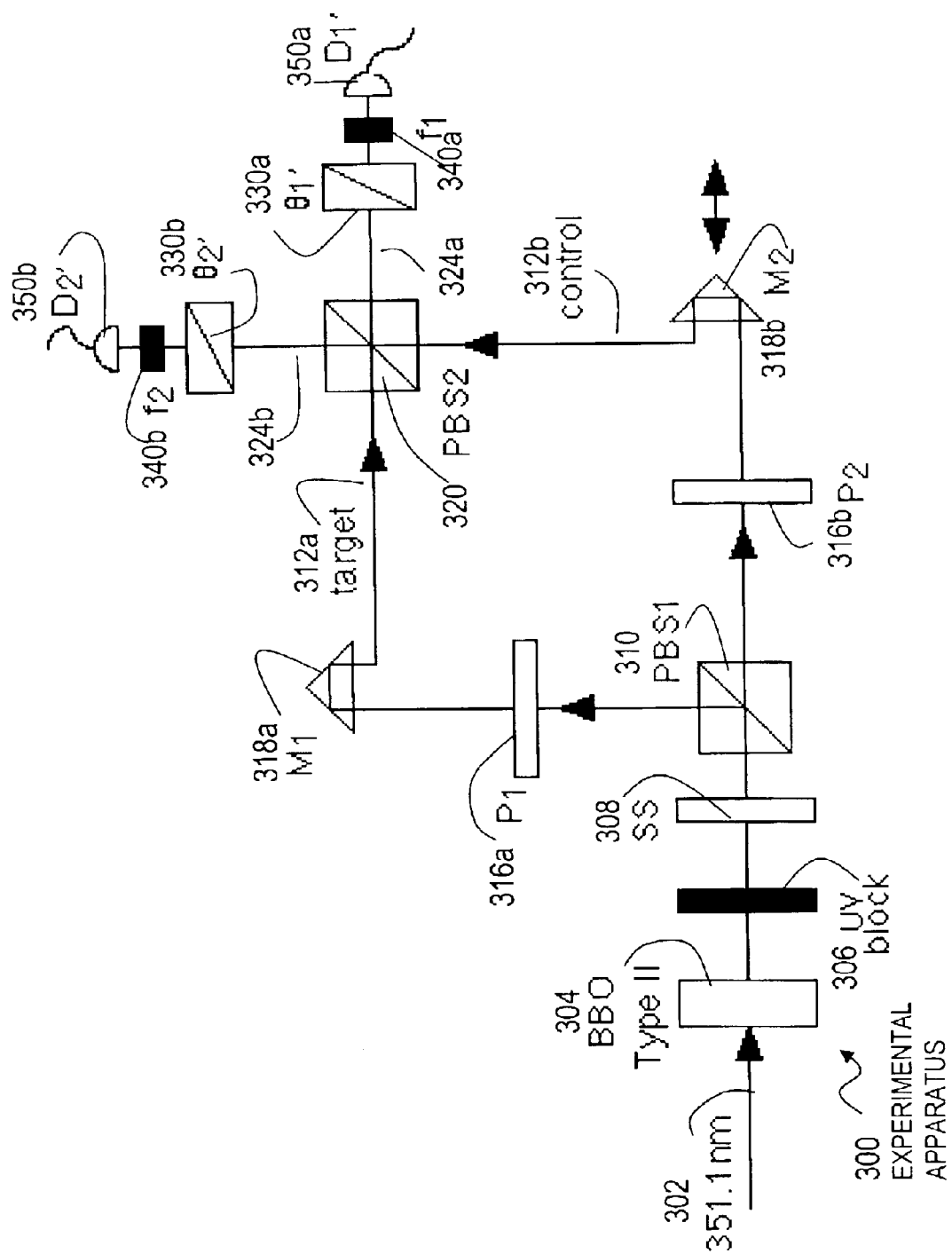
FIG. 3 is a block diagram that illustrates an experimental apparatus for indicating the performance of various embodiments of logic devices.

FIG. 3 is a block diagram that illustrates an experimental apparatus 300 for indicating the performance of various embodiments of logic devices. The logic devices are simulated by the components in the upper right, except components along spatial mode 324a, which are used to test the device output of the logic device, as described below. The rest of the components are used to generate two photons that arrive at the simulated device simultaneously.

The apparatus 300 includes a source 304 of two photons in correlated states. Photons with correlated states are sometimes called entangled photons. The superposition state, which indicates the probabilities of detections, associated with entangled photons cannot be expressed as the cross product of two independent superposition states each associated with a different photon.

The source in apparatus 300 is a type II parametric down-conversion crystal (BBO), well known in the art, which produces pairs of entangled photons, one polarized vertically and one horizontally. A 351.1-nanometer wavelength beam from an Argon-Ion laser energizes the source. Such a source is described, for example, by Y. H Shih and A. V. Sergienko, "Two-photon anti-correlation in a Hanbury-Brown-Twiss type experiment," *Physics Letters A*, vol. 186, p. 29, 1994 (hereinafter Shih) and by M. H. Rubin, D. N. Klyshko, Y. H. Shih, and A. V. Sergienko, "Theory of two-photon entanglement in type-II optical parametric down-conversion," *Physics Review A*, vol. 50, p. 5122, 1994 (hereinafter Rubin).

The apparatus 300 also includes an ultraviolet block 306 and a Shih-Sergienko longitudinal compensation crystal (SS) 308. The SS 308 compensates for the property of the BBO source that the V polarized photon is emitted a little ahead of the H polarized photon. Details concerning the operation of the SS 308 are described in Shih and Rubin.

The apparatus 300 also includes an H-V PBS 310 (also called "PBS1"), which reflects the V polarized photon of the pair of photons onto spatial mode 312a and transmits the H polarized photon along spatial mode 312b. One of two half-wave birefringent plates, P1 316a and P2 316b, and one of two mirrors, M1 318a and M2 318b, mounted on translation stages condition the photon on each spatial mode before its arrival at the simulated device. The path lengths of the spatial modes were adjusted to the same length using the mirrors 318a, 318b on the translation stages in order that the two photons arrive at the simulated logic device at the same time. The polarization of either photon can be rotated into any desired orientation using the half-wave birefringent plate 316a, 316b on its spatial mode (sometimes called a "path").

The apparatus includes a second H-V PBS 320 ("PBS2"), which serves as one of the components of the tested logic device. For example, H-V PBS 320 serves as the H-V PBS 210 of the quantum parity check device 200. H-V PBS 320 has two output spatial modes 324a, 324b.

The apparatus 300 includes an implementation of a polarization sensitive detector using a rotatable polarization analyzer 330b ("θ2") a filter 340b ("f2") and a single photon detector 350b ("D2"). A polarization analyzer passes photons polarized in the direction of the analyzer and blocks photons polarized in the perpendicular direction. A rotatable polarization analyzer is easily rotated to change the analyzer direction. The filter f2 reduces background noise from stray photons that might leak into the apparatus 300.

The apparatus includes components to measure the photon that is output to the post-detection processor using another rotatable polarization analyzer 330a ("θ1") another filter 340a ("f1") and another single photon detector 350a ("D1").

Apparatus 300 is configured to simulate one embodiment of quantum parity check device 200 in which the output is accepted unchanged whenever one photon is detected in single photon detector $Dc^F$ 224a and no photons are detected in single photon detector $Dc^S$ 224b. As described above, this occurs with a probability of ¼. In this configuration the rotatable polarization analyzer 330b is rotated to 45 degrees with respect to H to pass and detect at detector D2 350b only photons with F polarization. The condition of detecting one photon at single photon detector $Dc^F$ 224a and detecting no photons in single photon detector $Dc^S$ 224b corresponds to making coincident detections of photons at both detectors D2 350b and detector D1 350a. Since there are only two incident photons, a detection at both D1 350a and D2 350b implies no detection would be made of a photon with S polarization in detector $Dc^S$.

Returning to the quantum parity check device, FIGS. 2C, 2D, 2E, 2F are graphs that illustrate experimental results that indicate the performance of the quantum parity check device of FIG. 2A operating on non-superposition states. Each graph plots the number of coincident counts on coincident count axis 252 for each of two states measured on the output mode 324a as represented on axis 254. A zero on axis 254 indicates that the analyzer 330a was oriented to pass H polarized photons; a one on axis 254 indicates that the analyzer 330a was oriented to pass V polarized photons. The results agree with what would be expected from a parity check device to within an error on the order of 1%.

FIG. 2C represents the results when both input photons, on spatial modes 312a, 312b, respectively, are H polarized. This is achieved using apparatus 300 by orienting half-wave plate P1 316a to change the V polarized photon to an H polarized photon. The expected output is an H polarized photon every time a coincident detection is made, i.e., a large number of coincident counts when the analyzer 330a is rotated to pass H polarized photons, and no coincident counts when the analyzer 330a is rotated to pass V polarized photons. As can be seen from counts 262a and 264a, respectively, every time a coincident count is obtained, the photon on the output mode 324a is H polarized and essentially no coincident counts are obtained for photons that are V polarized.

FIG. 2D represents the results when one input photon of each pair, on spatial mode 312a, is H polarized and the other input photon, on spatial mode 312b, is V polarized. This is achieved using apparatus 300 by orienting half-wave plate P1 316a to change the V polarized photon to an H polarized photon and orienting half-wave plate P2 316b to change the H polarized photon to an V polarized photon. The expected output is no coincident counts, whether the analyzer 330a is rotated to pass H polarized photons or V polarized photons. As can be seen from counts 262b and 264b, almost no coincident counts are obtained. However, count 262b shows some coincident counts are obtained, which represents a small error in operation of the experimental implementation.

FIG. 2E represents the results when one input photon of each pair, on spatial mode 312a, is V polarized and the other input photon, on spatial mode 312b, is H polarized. This is achieved using apparatus 300 by orienting half-wave plates P1 316a and P2 316b to not change either the H polarized photon or the V polarized photon. The expected output is no coincident counts, whether the analyzer 330a is rotated to pass H polarized photons or V polarized photons, as in FIG. 2D. As can be seen from counts 262c and 264c, almost no coincident counts are obtained. However, count 262c shows some coincident counts are obtained, which represents a small error in operation of the experimental implementation.

FIG. 2F represents the results when both input photons, on spatial modes 312a, 312b, respectively, are V polarized. This is achieved using apparatus 300 by orienting half-wave plate P2 316b to change the H polarized photon to a V polarized photon. The expected output is an V polarized photon every time a coincident detection is made, i.e., no coincident counts when the analyzer 330a is rotated to pass H polarized photons, and a large number of coincident counts when the analyzer is 330a is rotated to pass V polarized photons. As can be seen from counts 264d and 262d, respectively, every time a coincident count is obtained, the photon on the output mode 324a is V polarized and essentially no coincident counts are obtained for photons that are H polarized.

FIG. 2G is a graph that illustrates experimental results that indicate the performance of the quantum parity check device of FIG. 2A operating on a superposition state. As described above with respect to Equation 3d, an arbitrary input state, represented by Equation 3a, on an input mode of a H-V PBS is coherently transferred to an output mode of the H-V PBS when the state of a photon on the check input mode is given by Equation 3b. Equation 3b represents a photon polarization of 45 degrees relative to H polarization. Therefore, the experimental results presented in FIG. 2G are based on rotating the H polarized photon entering spatial mode 312b by 45 degrees in the half-wave plate P2 316b in apparatus 300. It is noted that PBS2 320 transmits the H component of input mode 312a into output path 324a, as desired. However PBS2 320 totally reflects the V component into detected output path 324b where it is consumed by the single photon detector D2 350b. Consequently, the device should replace the arbitrary V component of Equation 3b, which has a value $\beta$, with a vertical component from the check input spatial mode 312b which is reflected into output spatial mode 324a and which has an input value of $\sqrt{2}$.

To produce the experimental results presented in FIG. 2G, the half-wave plate P1 316a was oriented to change the V polarized photon to a 20-degree polarized photon. This corresponds to values of 0.94 for $\alpha$ and 0.34 for $\beta$ in Equation 3a.

The graph in FIG. 2G plots the number of coincident counts per minute on coincident count rate axis 258 for each of several orientations measured on the output mode 324a as represented on axis 256. A 0 on axis 256 indicates that the analyzer 330a was oriented to pass H polarized photons; a 90 on axis 256 indicates that the analyzer 330a was oriented to pass 90 degree polarized photons (the same as V polarized photons). The observed count rates are represented by dots with vertical bars that represent the experimental error, such as observations 272.

The results expected are for output photons with the same 20 degree polarization as on input mode 312a when coincident counts are obtained. Such polarized photons should yield observation that follow a sine-squared curve with maximum coincident count rates at 20 degrees and 200 degrees, and with minimum, near zero, count rates at 110 degrees and 290 degrees. A sine-squared curve is empirically fit to the data to yield empirical fit curve 280. The results agree with what would be expected from a parity check device to within the experimental error. This demonstrates the coherent nature of the implemented parity check device when operating on superposition states.

3. Quantum Destructive Controlled NOT (CNOT) device 3.1 Quantum Destructive CNOT Structural Overview FIG. 4A is a block diagram that illustrates a destructive CNOT device 400, according to an embodiment. The function of a quantum CNOT is to flip the logical value of an input "target" qubit (a pure 0 state is flipped to a pure 1 state and a pure 1 state is flipped to a pure 0 state) if a second input, "control" qubit is in the pure 1 state and to do nothing if the control qubit is in the pure 0 state. For example, as is shown below, the quantum destructive CNOT device 400 produces an output photon with the same state as the target photon when the control photon is H polarized and produces an output photon with flipped H and V states when the control photon is V polarized. No measurement of the target qubit value or the control qubit value is obtained. The CNOT operation can be generalized to apply to superposition states, as described below. The destructive CNOT performs the same function as a CNOT but consumes the control photon in the process so that the control photon is not part of the output from the device.

The destructive CNOT device 400 includes an F-S PBS 410, like the one depicted in FIG. 1C. The H-V PBS 410 has input spatial modes 412 including target input mode 412a (also labeled mode "3'" in FIG. 4A) and a control input mode 412b (also labeled mode "b" in FIG. 4A). The H-V PBS 410 has output spatial modes 414 including a transmitted output mode 414a (also labeled mode "3" in FIG. 4A) and a detected output mode 414b (also labeled mode "d" in FIG. 4A). For purposes of illustration, it is assumed that the spatial modes depicted in FIG. 4A are in the horizontal plane as viewed from above.

The destructive CNOT device 400 also includes a polarization sensitive detector 420 (also labeled "Dd") that detects a number of single photons on detected output mode 414b.

The destructive CNOT device 400 also includes a post-detection processor 430 with a device output 440. Information about photons detected in detector 420 is sent over classical data link 432 to a post-detection processor 430. The post-detection processor 430 may include one or more classical information processing elements. The transmitted output mode 414a also enters the post-detection processor 430, where it may be blocked or transformed or transmitted unchanged to the device output 440.

3.2 Quantum Destructive CNOT Operation

A target photon arrives on mode 412a and a control photon arrives on mode 412b. The photons are assumed to arrive simultaneously, i.e., both photons arrive during a time interval short compared to a time interval during which either photon interacts with the beam splitter 410.

A photon output on transmitted mode 414a is accepted and transferred to device output 440 only for those cases in which polarization sensitive detector 420 receives one and only one ("1AO1") photon.

The detector 420 must distinguish between the arrival of zero, one and two photons without indicating the H-V state of the target and control photons. However, since the detected photons on mode 414b are in the F-S basis as a result of the F-S PBS 410, they provide no information about the H-V state of the target and control photons. Therefore the detector 420 may provide the H-V state of the photons detected.

FIG. 4B is a block diagram that illustrates a polarization sensitive photon detector 420 used in the quantum parity check device of FIG. 4A, according to an embodiment. This detector has the desirable property of distinguishing between zero, one and two photons without measuring the H-V state of the target and control photons.

Polarization sensitive detector 420 includes an H-V PBS 422, like the H-V PBS illustrated in FIG. 1B, and two single photon detectors 424. The input mode of H-V PBS 422 is aligned to receive the photons output onto detected output mode 414b (also labeled "d" in FIG. 4A and FIG. 4B). In the illustrated embodiment, an H polarized photon emitted by H-V PBS 422 on a transmitted output mode is detected by single photon detector 424a (represented by the symbol "$Dd^H$"); and a V polarized photon emitted by F-S PBS 422 on a reflected output mode is detected by single photon detector 424b (represented by the symbol "$Dd^V$").

Because an F polarized photon is an equal superposition of H and V polarizations, for example, a measurement of an F polarized photon provides no information regarding the original H-V states of the target and control photons. The use of the F-S PBS 410 is said to "erase" any H-V information in the detected photons that pass through the H-V PBS 422, and thus preserves the coherence of the photons operated upon by the device 400.

To show the probabilistic effects of a superposition of states on the quantum destructive CNOT device, it is assumed for purposes of illustration that the target photon has an arbitrary polarization state Ψin given by Equation 3a and repeated here for convenience as Equation 4a. The check photon is first considered to be vertically polarized and has the particular state Ψb given by Equation 4b.

$$\Psi\text{in} = \alpha H\text{in} + \beta V\text{in} \quad (4a)$$

$$\Psi b = Vb \quad (4b)$$

The total input state Ψin,b at the F-S PBS is given by the vector cross product of these two states, as is well known in the art. Writing these states in the FS basis gives the total input state expressed as the cross product (X) in Equation 4c.

$$\Psi\text{in},b = \{(\alpha[F\text{in}-S\text{in}] + \beta[F\text{in}+S\text{in}])/\sqrt{2}\} X \{(Fb+Sb)/\sqrt{2}\} \quad (4c)$$

The output state Ψout,d of the two photons from the F-S PBS beam splitter on the transmitted mode 414a ("out") and detected mode 414b ("d") is given by Equation 4d.

$$\Psi\text{out},d = \frac{1}{2}(\alpha[FdF\text{in}-SdS\text{in}] + \beta[FdF\text{in}+SdS\text{in}]) + \Psi\text{fail2}/\sqrt{2} \quad (4d)$$

The states in Ψfail2 lead to two or zero photons at detector 420, which cause output photons to be blocked in post-detection processor 430. Written in terms of the H-V polarizations, this becomes the expression given by Equation 4e.

$$\Psi\text{out},d = \frac{1}{2}(Hd[\alpha V\text{out}+\beta H\text{out}] + Vd[\alpha H\text{out}+\beta V\text{out}]) + \Psi\text{fail2}/\sqrt{2} \quad (4e)$$

The Hd term indicates that when 1AO1 photon is detected in detector $Dd^H$ 424a and no photons are detected in detector $Dd^V$ 424b, the arbitrary polarization of the input photon ($\alpha H\text{in}+\beta V\text{in}$) on mode 412a is flipped in the photon in mode 414a ($\alpha V\text{out}+\beta H\text{out}$). This desired output from a CNOT occurs with a probability of ¼. The Vd term indicates that when 1AO1 photon is detected in detector $Dd^V$ 424b and no photons are detected in detector $Dd^H$ 424a, the arbitrary polarization of the input photon ($\alpha H\text{in}+\beta V\text{in}$) on mode 412a is mapped directly into the photon in mode 414a ($\alpha H\text{out}+\beta V\text{out}$). This also occurs with a probability of ¼. To convert this output photon to the desired flipped photon involves further operations on the output photon, such as a rotation of the polarization by 90 degrees and then applying a phase shift of 180 degrees ($\pi$ radians). If the output is so transformed in this case, then the desired output can be obtained with a probability of ½.

To further show the probabilistic effects of a superposition of states on the quantum destructive CNOT device, it is assumed for purposes of illustration that the target photon has the arbitrary polarization state Ψin given by Equation 4a, as above, and that the control photon is H polarized, as given by Equation 4f.

$$\Psi b = Hb \quad (4f)$$

Following steps similar to those that produce Equation 4e, it can be shown that the output state for a H polarized control photon is given by Equation 4g.

$$\Psi\text{out},d = \frac{1}{2}(Hd[\alpha H\text{out}+\beta V\text{out}] + Vd[\alpha V\text{out}+\beta H\text{out}]) + \Psi\text{fail3}/\sqrt{2} \quad (4g)$$

The states in Ψfail3 lead to two or zero photons at detector 420, which cause output photons to be blocked in post-detection processor 430. The Hd term indicates that when 1AO1 photon is detected in detector $Dd^H$ 424a and no photons are detected in detector $Dd^V$ 424b, the arbitrary polarization of the input photon ($\alpha H\text{in}+\beta V\text{in}$) on mode 412a is mapped directly into the photon in mode 414a ($\alpha H\text{out}+\beta V\text{out}$). This desired output from a CNOT occurs with a probability of ¼. The Vd term indicates that when 1AO1 photon is detected in detector $Dd^V$ 424b and no photons are detected in detector $Dd^H$ 424a, the arbitrary polarization of the input photon ($\alpha H\text{in}+\beta V\text{in}$) on mode 412a is flipped in the photon in mode 414a ($\alpha V\text{out}+\beta H\text{out}$). This also occurs with a probability of ¼. To convert this output photon to a photon with the desired unflipped polarization involves further operations on the output photon, such as a rotation of the polarization by 90 degrees and then applying a phase shift of 180 degrees ($\pi$ radians).

According to one embodiment, the post-detection processor 430 passes a photon on output mode 414a to device output 440 only when one photon is detected in detector $Dd^H$ 424a and no photons are detected in detector $Dd^V$ 424b. This embodiment succeeds with a probability of ¼. According to another embodiment, in addition to passing a photon on output mode 414a to device output 440 when one photon is detected in detector $Dd^H$ 424a and no photons are detected in detector $Dd^V$ 424b, the post-detection processor 430 also rotates the photon polarization by 90 degrees and phase shifts the photon on output mode 214 by 180 degrees and passes the rotated, phase-shifted photon to device output 440 when one photon is detected in detector $Dd^V$ 424b and no photons are detected in detector $Dd^H$ 424a. This embodiment succeeds with a probability of ½. Any method known in the art may be used for imparting a 180-degree phase shift and the 90-degree rotation. For example, a half-wave birefringent plate can be used to rotate the photon on output mode 414a.

It is noted that accepting either of the two 1AO1 detections does not provide any type of H-V polarization information that would essentially serve to measure the state of the target and control photons on input modes 412 and decrease the coherence of the photons being operated upon.

3.3 Destructive CNOT Experimental Results

Apparatus 300 in FIG. 3 is configured to simulate one embodiment of quantum destructive CNOT device 400 in which the output is accepted unchanged whenever one photon is detected in single photon detector $Dd^H$ 424a and no photons are detected in single photon detector $Dd^V$ 224b. As described above, this occurs with a probability of ¼.

In this configuration, the basis of PBS2 320 is considered to be the F polarization and the H polarization is rotated −45 degrees with respect to the F polarization. Therefore the detector $Dd^H$ 424a is implemented by rotating the rotatable polarization analyzer 330b by −45 degrees. The condition of detecting one photon at single photon detector $Dd^H$ 424a and detecting no photons in single photon detector $Dd^V$ 424b corresponds to making coincident detections of photons at both detectors D2 350b and detector D1 350a. Since there are only two incident photons, a detection at both D1 350a and D2 350b implies no detection would be made of a photon with V polarization in detector $Dd^V$.

Figure 4C:
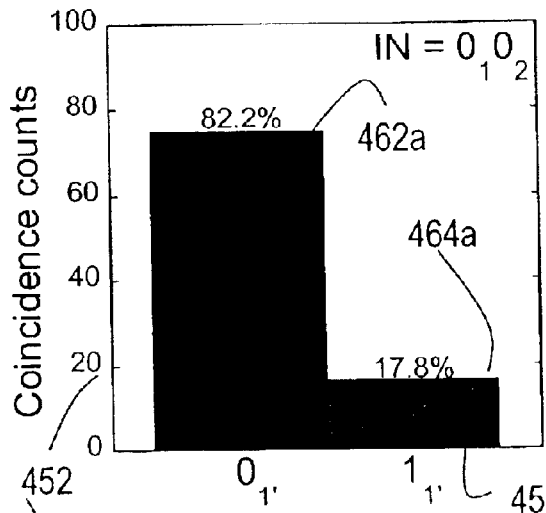
FIGS. 4C, 4D, 4E, 4F are graphs that illustrate experimental results that indicate the performance of the quantum destructive CNOT device of FIG. 4A operating on non-superposition states.

FIGS. 4C, 4D, 4E, 4F are graphs that illustrate experimental results that indicate the performance of the quantum destructive CNOT device of FIG. 4A operating on non-superposition states. Each graph plots the number of coincident counts on coincident count axis 452 for each of two states measured on the output mode 324a as represented on axis 454. A zero on axis 454 indicates that the analyzer 330a was oriented −45 degrees with respect to the basis of PBS2 320 to pass H polarized photons; a one on axis 454 indicates that the analyzer 330a was oriented to +45 degrees with respect to the basis of PBS2 320 to pass V polarized photons. The results agree with what would be expected from a CNOT device to within an error on the order of 18%.

For example, FIG. 4C represents the results when both input photons, the target and control photons, on spatial modes 312a, 312b, respectively, are H polarized. This is achieved using apparatus 300 by orienting half-wave plate P1 316a to change the 90 degree polarized photon relative to the basis of PBS2 320 to an H polarized photon, −45 degrees with respect to the basis of PBS2 320. Similarly, half-wave plate P2 316b is oriented to change the 0 degree polarized photon to −45 degrees. The expected output is an unflipped output, i.e., an H polarized photon every time a coincident detection is made. This is represented by a large number of coincident counts when the analyzer 330a is rotated −45 degrees to pass H polarized photons, and no coincident counts when the analyzer is 330a is rotated +45 degrees to pass V polarized photons. As can be seen from counts 462a and 464a, respectively, 82.2% of the time a coincident count is obtained, the photon on the output mode 324a is H polarized, as desired; but 17.8% of the time coincident counts are obtained, the photons are V polarized, which is error.

Figure 4D:
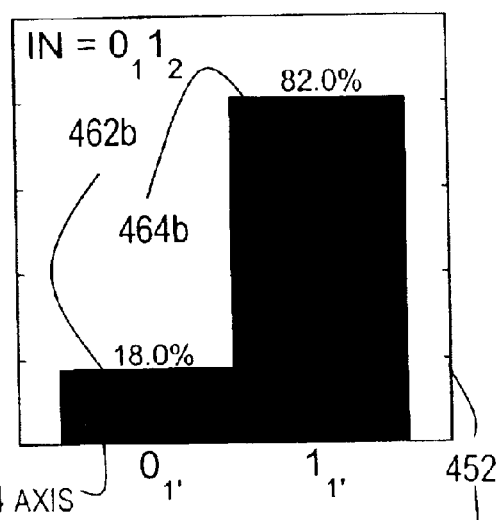
Figure 4E:
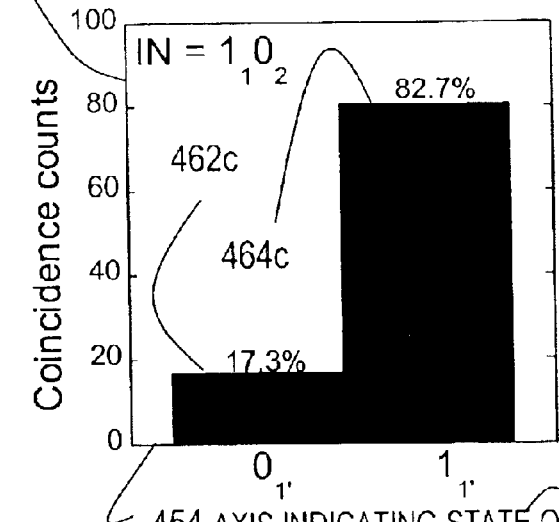
Figure 4F:
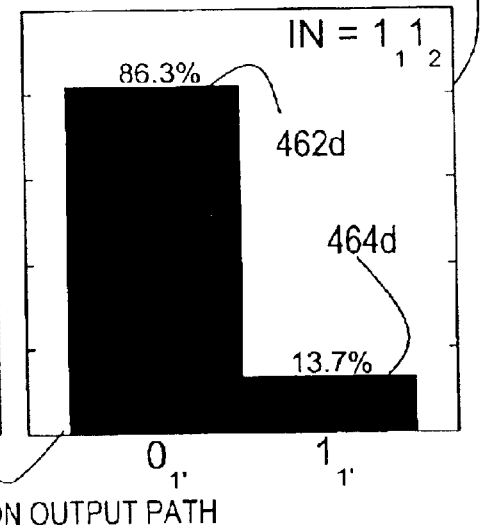

FIG. 4D represents the results when the target photon of each pair, on spatial mode 312a, is H polarized and the control photon, on spatial mode 312b, is V polarized. The expected output is a flipped state of the target to V polarization whenever there is a coincident count. As can be seen from counts 464b and 462b, respectively, 82% of the time a coincident count is obtained, the photon on the output mode 324a is V polarized, as desired; but 18% of the time coincident counts are obtained, the photons are H polarized, which is error. FIG. 4E represents the results when the target photon of each pair, on spatial mode 312a, is V polarized and the control photon, on spatial mode 312b, is H polarized. The expected output is the state of the target, V polarization, whenever there is a coincident count. As can be seen from counts 464c and 462c, respectively, 82.7% of the time a coincident count is obtained, the photon on the output mode 324a is V polarized, as desired; but 17.3% of the time coincident counts are obtained, the photons are H polarized, which is error. FIG. 4F represents the results when both input photons, the target and control photons, on spatial modes 312a, 312b, respectively, are V polarized. The expected output is a flipped state of the target to H polarization whenever there is a coincident count. As can be seen from counts 462d and 464d, respectively, 86.3% of the time a coincident count is obtained, the photon on the output mode 324a is H polarized, as desired; but 13.7% of the time coincident counts are obtained, the photons are V polarized, which is error.

The results presented in FIGS. 4C, 4D, 4E, 4F are for cases in which all of the input qubits have the value 0 or the value 1. In other cases, representing the superposition of these two states, errors are sometimes much less than 1%. The mean error, when averaged over all possible input states, is approximately 8%. It is expected that these errors are due largely to the optical quality of the polarizing beam splitters, which are of commercial quality and have distortions on the order of a quarter wave. Much lower error rates are expected using custom-made polarizing beam splitters and single mode optical fibers.

With superposition of input states, coherent results are obtained that are similar to those presented above in FIG. 2G. This indicates that the destructive CNOT operations are performed without measuring the states of the input qubits, and are useful for quantum networks of logical devices.

4. Quantum Encoder 4.1 Quantum Encoder Structural Overview

Figure 5:
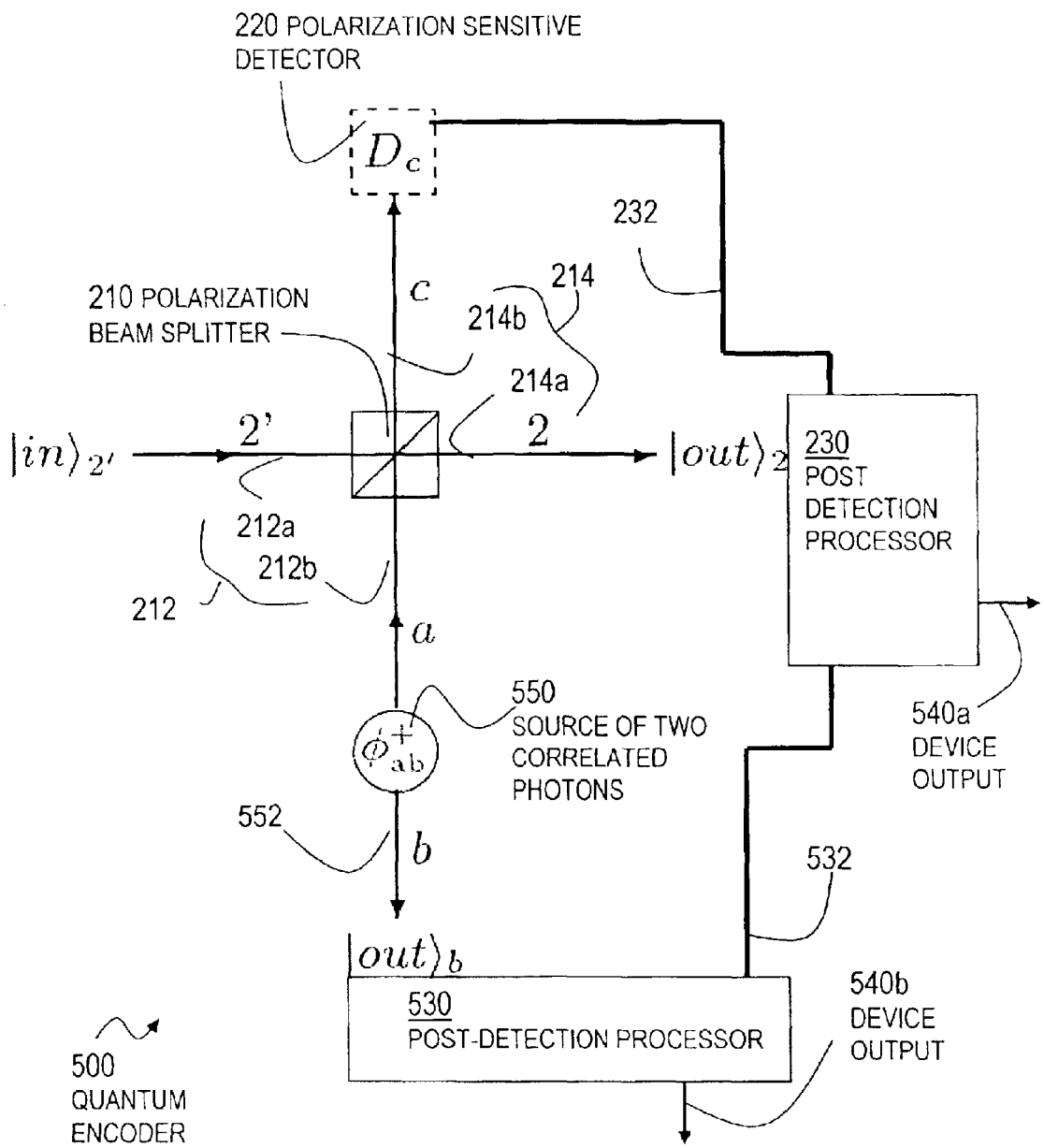
FIG. 5 is a block diagram that illustrates a quantum encoder, according to an embodiment.

FIG. 5 is a block diagram that illustrates a quantum encoder 500, according to an embodiment. The function of a quantum encoder is to encode the value of an input qubit into two output spatial modes. For example, as is shown below, the quantum encoder 500 produces two output photons with the same polarization state as the input photon. No measurement of the input qubit value or either output qubit value is obtained, which preserves coherence and distinguishes quantum encoding from quantum cloning.

The quantum encoder 500 combines the quantum parity check device 200 with a source 550 of two entangled photons. Multiple entangled photons have states that cannot be expressed as the cross product of the individual states of the individual photons. The states of entangled photons are correlated and therefore not independent. As described above with reference to FIG. 2A, the parity check device 200 includes an H-V PBS 210 with output spatial mode 214b directed to polarization sensitive detector Dc 220 and output spatial mode 214a directed to post-detection processor 230. The device output 240 from the quantum parity check device serves as a first device output 540a of the quantum encoder 500.

One of the photons from the source 550 serves as the check photon for the quantum parity check device 200 aligned with input mode 212b (also labeled "a" in FIG. 5). The other photon from the source 550 is emitted onto spatial mode 552 (also labeled "b" in FIG. 5).

The encoder 500 also includes another post-detection processor 530 with a second device output 540b. Information about photons detected in detector 220 is sent over classical data link 532 to post-detection processor 530. The post-detection processor 530 may include one or more classical information processing elements. The second photon from the source 550 on source output mode 552 also enters the post-detection processor 530, where it may be blocked or transformed or transmitted unchanged to the second device output 540b.

4.2 Quantum Encoder Operation

In the illustrated embodiment, the entangled state Φa,b of the two photons emitted by source 550 is given by $$\Phi a,b = (HaHb + VaVb)/\sqrt{2} \tag{5a}$$

With this entangled state for the photons from source 550, and an arbitrarily polarized input state given in Equation 3a, it can be shown that successful detection of 1AO1 photon by detector Dc 220 selects the transformation Ψencoder given in Equation 5b.

$$\Psi\text{encoder} = \alpha HaHb + \beta VaVb \tag{5b}$$

Equation 5b indicates that two entangled photons, each with amplitudes α and β for the H and V states, respectively, are output on the two device outputs 540a, 540b. As occurs in the quantum parity check, the operation of the quantum encoder succeeds with a probability of ½.

5. Quantum Relay 5.1 Quantum Relay Structural Overview

FIG. 6A is a block diagram that illustrates a quantum relay 600, according to an embodiment. The function of a quantum relay is to output a qubit in the same state as an input qubit on a qubit communications channel provided that a quantum non-demolition (QND) measurement has verified that a qubit has actually been input. For example, as is shown below, the quantum relay 600 outputs a photon with the same polarization state as the input photon provided that an input photon has actually been received on mode 212a. No measurement of the H-V state of the input qubit or output qubit value is obtained, which preserves qubit coherence. A quantum relay is distinguished from a quantum repeater because a quantum relay does not require entanglement purification or the storage of a photon for an extended period of time.

The quantum relay 600 combines the quantum encoder 500 with a second polarization sensitive detector D2 620 and additional post-detection operations in post detection processor 630. Post-detection processor 630 includes operations of the post-detection processors 230, 530 of the encoder 500.

As described above with reference to FIG. 5, the quantum encoder 500 includes an H-V PBS 210 with output spatial mode 214b directed to polarization sensitive detector Dc 220 and output spatial mode 214a. The quantum encoder 500 also includes a source 550 of two entangled photons. One of the entangled photons from the source 550 is output on spatial mode 212b (also labeled "a" in FIG. 5 and FIG. 6A) that is input to the H-V PBS 210. The other entangled photon from the source 550 is emitted onto spatial mode 552 (also labeled "b" in FIG. 5 and FIG. 6A). Information about photons detected in detector Dc 220 is sent over classical data link 232 to post-detection processor 230 and over link 532 to post-detection processor 530. In FIG. 6A links 232 and 532 are represented by link 632a to post processor 630.

In addition, the quantum relay 600 directs the output mode 214a to the second polarization sensitive detector D2 620. The quantum relay 600 includes link 632b, which passes information, typically as one or more classical bits, about the photons detected in detector D2 620 to the post-detection processor 630.

The post-detection processor 630 may include one or more classical information processing elements. The second photon from the source 550 on source output mode 552 also enters the post-detection processor 630, where it may be blocked or transformed or transmitted unchanged to the relay device output 640. Although the illustrated embodiment of the quantum relay 600 shows that output mode 552 is directed into the post-detection processor 630 via a mirror 664, in other embodiments the mirror 664 may be omitted. In the illustrated embodiment, the post-detection processor also outputs a classical gate signal 642. A classical bit on gate signal 642 has a value 1 when a photon has been received on input mode 212a and has a value 0 when a photon has not been received on input mode 212a.

FIG. 6B is a block diagram that illustrates a polarization sensitive photon detector 620 used in the quantum relay of FIG. 6A, according to an embodiment. This detector has the desirable property of distinguishing between zero, one and two photons without measuring the H-V state of the photons detected. Polarization sensitive detector 620 includes a F-S PBS 622, like the F-S PBS illustrated in FIG. 1C, and two single photon detectors 624. The input mode of F-S PBS 222 is aligned to receive the photons output onto output mode 214a (also labeled mode "2" in FIG. 6A and FIG. 6B). In the illustrated embodiment, an F polarized photon emitted by F-S PBS 622 on a transmitted output mode is detected by single photon detector 624b (represented by the symbol "$D_2^F$"); and an S polarized photon emitted by F-S PBS 622 on a reflected output mode is detected by single photon detector 624a (represented by the symbol "$D_2^S$").

5.2 Quantum Relay Operation

The quantum encoder is converted to a quantum non-demolition (QND) measurement device by adding the second polarization sensitive detector D2 620 on the output path 214a (also labeled "2" in FIG. 6A). For an input photon on spatial mode 212a having an arbitrary state given by Equation 3a, if 1AO1 photon is detected in both detectors 220, 620, then the projected state of the system (excluding states that cause zero or two photons to be detected at either detector), represented by the symbol $\Psi b,c,_2$, can be shown to be given by Equation 6.

$$\Psi b,c,_2 = \tfrac{1}{2}(\alpha Hb[F_2Fc+S_2Fc+F_2Sc+S_2Sc]+\beta Vb[F_2Fc-S_2Fc-F_2Sc+S_2Sc]) \quad (6)$$

where "b" represents the photon on output spatial mode 552. Equation 6 indicates that the device output 640 can yield the desired state of $\alpha H + \beta V$ if the post-detection processor 630 passes detections involving only $D_2^F$ and $Dc^F$ ($F_2$ and Fc) or only $D_2^S$ and $Dc^S$ ($S_2$ and Sc) and reverse the sign of the $\beta$ term for detections involving only $D_2^S$ and $Dc^F$ ($S_2$ and Fc) or only $D_2^F$ and $Dc^S$ ($F_2$ and Sc). The quantum relay 600 implements a probabilistic QND measurement on an input photon in the sense that a classical signal is generated only when an input photon is present without affecting the state of polarization of the input photon. The operation of the quantum relay succeeds with a probability of ½.

The utility of placing the second detector 620 on output mode 214a rather than output mode 552 can be understood by considering the device when there is no photon present in the input mode 212a. In this case the joint 1AO1 condition for both detectors cannot be fulfilled because only one of the detectors 210, 620 receives the ancilla photon output on mode 212b (also labeled mode "a"). If the second detector 620 were moved to output mode 552, then the device could satisfy the 1AO1 photon condition on both detectors from the two ancilla photons even when no photon is present in the input mode 212a.

The classical signals from detectors 220, 620 can be combined to provide a classical gate signal 642, e.g., a bit that has the value 1 when 1AO1 photon is detected on both detectors and has the value 0 otherwise.

5.3 Quantum Relay Application in Quantum Cryptography

The quantum relay may be applied to a quantum communication system, such as employed for quantum cryptography. The maximum range of current quantum cryptography systems using optical fiber is limited by a combination of attenuation (loss of information-carrying photons as they propagate through the optical fiber) and dark counts (a form of detector noise in which a detector gives a signal indicating a detection when no information-carrying photon impinged on the detector). Cryptographic information processing, such as error correction and privacy amplification, becomes increasingly inefficient as the number of information-carrying photons becomes comparable to a detector's dark count, and the effective throughput of the cryptographic system rapidly drops toward zero.

The range can be extended using quantum repeaters. It is preferable to extend the range with quantum relays, rather than quantum repeaters, because the quantum relays do not require difficult to implement steps such as entanglement purification or storing photons for an appreciable time, which are required by quantum repeaters. Attenuation still occurs, but the effects of dark counts are suppressed using QND measurements. This increases a signal to noise ratio and increases the efficiency of cryptographic processing. By optimally distributing quantum relays throughout the optical fiber communication channel, the impact of detector noise can be made negligible.

Figure 6C:
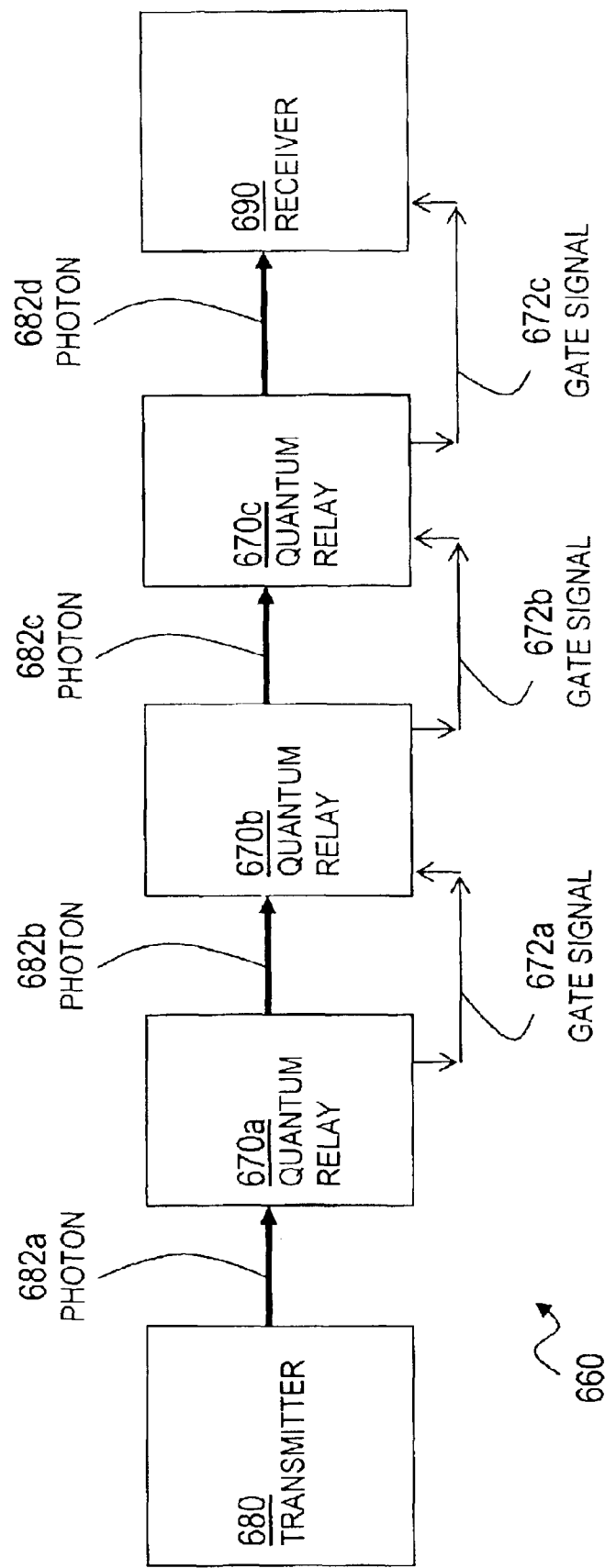
FIG. 6C is a block diagram that illustrates a quantum relay system, according to an embodiment.

FIG. 6C is a block diagram that illustrates a quantum relay system 660 according to one embodiment. A transmitter 680 generates a series of photons 682a that each has a particular polarization that indicates a qubit value for transmission over optical fiber to receiver 690. For example one qubit of an encrypted message is encoded on photon 682a for transmission to receiver 690 where the qubit is decrypted to produce a qubit or classical bits of plain text information. A set of one or more quantum relays are disposed along the optical fiber; for example, quantum relays 670a, 670b, 670c, collectively referenced as quantum relays 670, are distributed along an optical fiber connecting transmitter 680 to receiver 690 in the illustrated embodiment.

Each relay 670 performs a QND measurement to determine whether a photon is received on its input mode or whether the photon has been lost in transmission through the optical fiber up to that point. If a photon is not detected beyond some point in the transmission line, then the classical gate signal is used to ignore that event and not accept any output from a detector in the receiver 690.

For example, if quantum relay 670a, detects a photon on its input mode, then it sets its gate signal 672a to the value 1 to indicate a successful transmission to that point and outputs a photon 682b with the same polarization state information as photon 682a. Similarly, if quantum relays 670b, 670c, detect photons on their input modes, then they set their gate signals 672b, 672c, respectively, to the value 1 to indicate successful transmission to their locations and they output photons 682c, 682d, respectively. When receiver 690 detects a photon while the value of gate signal 672c is set to 1, the receiver 690 accepts the photon as a qubit-bearing photon and processes a detected qubit value.

If, for example, quantum relay 670b does not detect a photon on its input mode, then its gate signal 672b is set to 0 to indicate that no qubit-bearing photon has been received at that time. This gate signal is transmitted to quantum relay 670c, which transfers the value of 0 to its gate signal 672c. Based on the value of the gate signal 672c, the receiver 690 is notified that no qubit-bearing photon is available at that time. Even if a detector in receiver 690 generates a dark count at that time, the count is ignored. This has the effect of suppressing dark counts at the receiver 690, which decreases noise and increases signal to noise. As a result, the effectiveness of quantum processing techniques, such as error correction and privacy amplification during quantum cryptographic processing, is increased.

Any method may be used to transfer the gate signal received at a quantum relay to the gate signal output by the quantum relay. For example, a gate signal input may be added to post detection processor 630 that may include classical logic operations that require a gate signal received from another quantum relay to have the value 1 in addition to requiring 1AO1 detection from detectors 220, 620.

It is important to include the effects of detector dark counts in the quantum relays 670 themselves and the probabilistic detections of qubit bearing photons. Any spurious photons generated by the relays will be attenuated as they propagate through the optical fiber. As long as the relays 670 are sufficiently far from the receiver 690, attenuation causes the contribution from such spurious photons to be much smaller that the dark count in the receiver 690. Furthermore, the factor of ½ loss associated with the probabilistic QND measurements can be kept much smaller that the inefficiency in error correction and privacy amplification that would have occurred without the dark count suppression provided by the quantum relays 670.

6. Quantum Non-Destructive CNOT Device 6.1 Quantum CNOT Structural Overview

Figure 7:
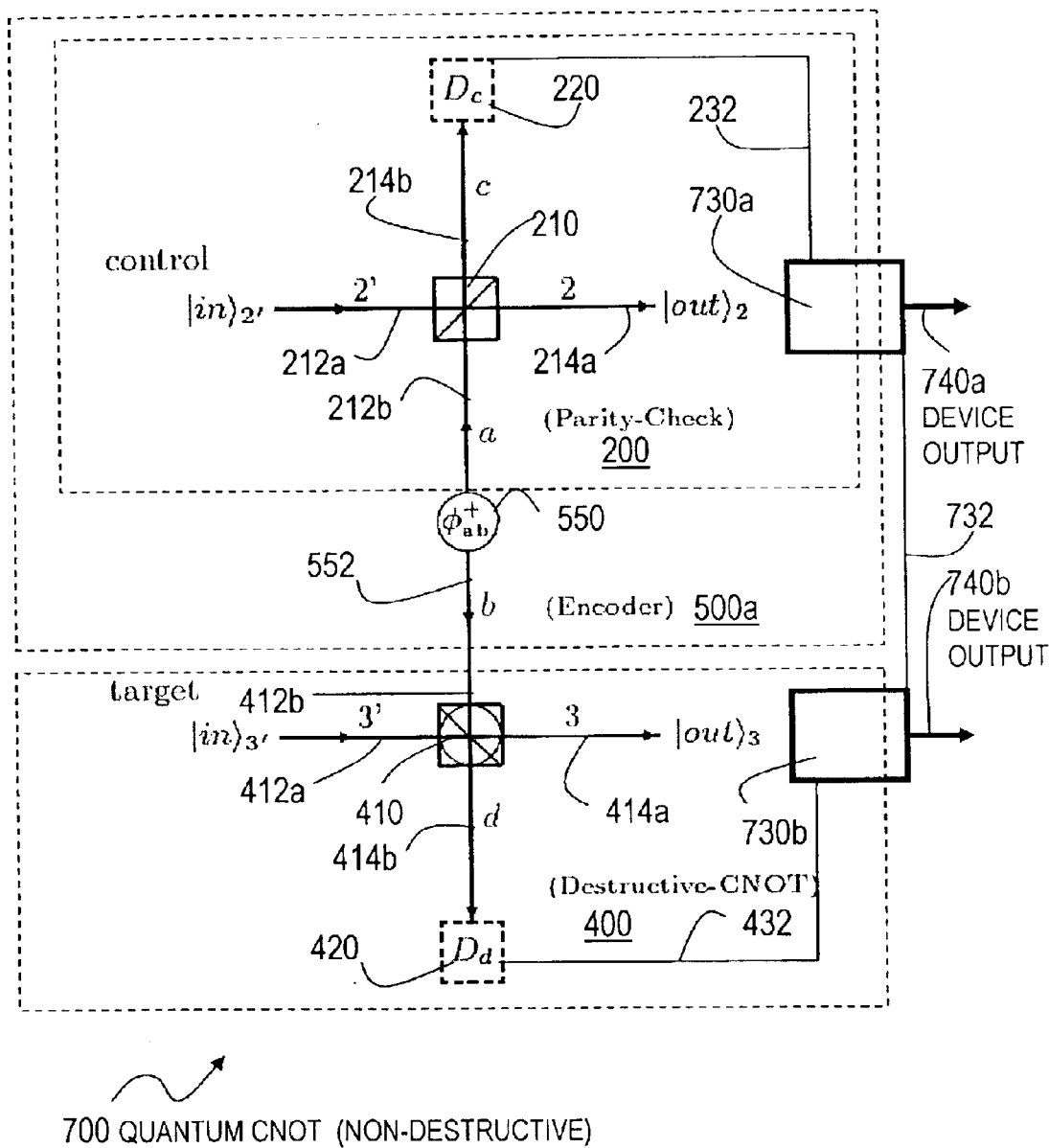
FIG. 7 is a block diagram that illustrates a quantum CNOT, according to an embodiment.

FIG. 7 is a block diagram that illustrates a quantum non-destructive CNOT 700, according to an embodiment. As described above, the function of a quantum CNOT for polarized photons is to produce an output photon with the same state as the target photon when the control photon is H polarized and produce an output photon with flipped H and V states when the control photon is V polarized. The CNOT operation can be generalized to apply to superposition states in the control photon, as described above. This CNOT performs the same function as the destructive CNOT described above, but does not consume the control photon in the process; thus, this quantum CNOT is able to output a photon with the same polarization state as the control photon.

The CNOT 700 combines an embodiment of the quantum encoder 500a with a destructive CNOT 400 to produce two device outputs 740a, 740b. One of the encoder device outputs on mode 5552 is used to output a photon used as the control input for the destructive CNOT 400. The other device output of the encoder is used to propagate the state of the control input photon on mode 212a to a first CNOT output 740a when the encoder is successful. The second CNOT output 740b carries a photon that has the same state as the target photon on input mode 412a or has a flipped H-V state, based on the state of the control photon. Thus the two outputs 740a, 740b pass the state information of the control photon and the flipped or unflipped state of the target photon, respectively.

As described above with reference to FIG. 5, the quantum encoder 500 combines the quantum parity check device 200 with a source 550 of two entangled photons. As described above with reference to FIG. 2A, the parity check device 200 includes an H-V PBS 210 with output spatial mode 214b directed to polarization sensitive detector Dc 220 and output spatial mode 214a directed to post-detection processor 230. Information about photons detected in detector 220 is passed to post-detection processor 230 over data link 232. In the illustrated embodiment, CNOT post-detection processor 730a includes the quantum parity check device post-detection processor 230. The device output 240 from the quantum parity check device serves as the first device output 540a of the quantum encoder 500 which serves as a first device output 740a of the CNOT 700.

One of the photons from the source 550 serves as the check photon for the quantum parity check device 200 aligned with input mode 212b (also labeled "a" in FIG. 7). The other photon from the source 550 is emitted onto spatial mode 552 (also labeled "b" in FIG. 5) where it becomes the control photon for the destructive CNOT 400.

The encoder 500 also includes another post-detection processor 530 with a second device output 540b. Information about photons detected in detector 220 is sent over classical data link 532 to post-detection processor 530. The post-detection processor 530 may include one or more classical information processing elements. The second photon from the source 550 on source output mode 552 also enters the post-detection processor 530, where it may be blocked or transformed or transmitted unchanged to the second device output 540b. In the illustrated embodiment, operations in the post-detection processor 730a or 730b or both replace the operations performed in post-detection processor 530 for embodiment 500a of encoder 500.

As described above with reference to FIG. 4, the destructive CNOT 400 includes a F-S PBS 410, like the one depicted in FIG. 1C. The H-V PBS 410 has input spatial modes 412 including target input mode 412a (also labeled mode "3'" in FIG. 7) and a control input mode 412b (also labeled mode "b" in FIG. 7). The H-V PBS 410 has output spatial modes 414 including a transmitted output mode 414a (also labeled mode "3" in FIG. 7) and a detected output mode 414b (also labeled mode "d" in FIG. 7). The destructive CNOT device 400 also includes a polarization sensitive detector 420 (also labeled "Dd") that detects a number of single photons on detected output mode 414b. The destructive CNOT device 400 also includes a post-detection processor 430 with a device output 440. Information about photons detected in detector 420 is sent over communication link 432 to a post-detection processor 430. The post-detection processor 430 may include one or more classical information processing elements. The transmitted output mode 414a also enters the post-detection processor 430, where it may be blocked or transformed or transmitted unchanged to the device output 440. In the illustrated embodiment, CNOT post-detection processor 730b includes the destructive CNOT post-detection processor 430. The device output 440b from the destructive CNOT serves as the second device output 740b of the CNOT 700.

In the illustrated embodiment, information about the photons detected in the encoder is passed to the post-detection processor 730b through data link 732. In other embodiments, such as embodiments that include post-detection processor 530 in the encoder, the data link 732 may be omitted.

6.2 Quantum CNOT Operation

Since the parity check device 200 and the destructive CNOT 400 each succeed with a probability of ½, it follows that the CNOT 700 succeeds with a probability of ¼.

The operation of the CNOT 700 can be explained by considering an arbitrary input state, designated $\Psi2'3'$, for the control and target photons on input modes 2' (212a) and 3' (412a), respectively, as given by Equation 7a.

$$\Psi2'3'=\alpha1H2'H3'+\alpha2H2'V3'+\alpha3V2'H3'+\alpha4V2'V3' \tag{7a}$$

The total state $\Psi t$ is given by Equation 7b.

$$\Psi t=\Psi2'3'\times\Phi a,b \tag{7b}$$

where $\Phi a,b$ is the state of the entangled photons from source 550. It can be shown that the total state $\Psi t$ evolves under CNOT 700 to the final total state $\Psi T$ given by Equation 7c.

$$\Psi T = \frac{1}{4}\{FcHd[\alpha1H2H3+\alpha2H2V3+\alpha3V2V3+\alpha4V2H3]+ \tag{7c}$$
$$ScHd[-\alpha1H2H3-\alpha2H2V3+\alpha3V2V3+\alpha4V2H3]+$$
$$FcVd[\alpha1H2V3+\alpha2H2H3+\alpha3V2V3+\alpha4V2V3]+$$
$$ScVd[-\alpha1H2V3-\alpha2H2H3+\alpha3V2H3+\alpha4V2V3]\}+$$
$$\frac{1}{2}\Psi fail4\sqrt{3}$$

where $\Psi fail4$ is a normalized combination of all of the amplitudes that would not lead to 1AO1 photon in each of the polarization sensitive detectors Dc 220, Dd 420.

The first of the four terms inside the curly brackets is obtained when 1AO1 photon is detected in $Dc^F$ 224a and 1AO1 photon is detected in $Dd^H$ 424a and gives the desired CNOT transformation on the input state of Equation 7a with a success probability of 1/16. This corresponds to the passive success conditions of the quantum parity check device 200 and the destructive CNOT 400. The next three of the four terms inside the curly brackets occur with different combinations of 1AO1 photons detected in each of Dc 220 and Dd 420 and require different appropriate combinations of the classically controlled single-photon operations used in the parity check device and destructive CNOT described above, which are performed in post-detection processors 730a or 730b or both. These four terms may then be combined for a total probability of success of ¼.

The second term inside the curly brackets corresponds to a detection in $Dc^s$ 224b which should trigger the polarization dependent 180 degree phase shift on output mode 214a (also labeled "2") that reverses the amplitude of H2. The third term inside the curly brackets corresponds to a detection in $Dd^V$ 224b which should trigger the state flip on the photon in output mode 414a (also labeled "3") that swaps the amplitudes of H3 and V3. The third term inside the curly brackets corresponds to both of these detections and therefore triggers both of these single-photon operations.

No measurement of the H-V state of the target qubit or control qubit value is obtained, which preserves qubit coherence during operation of this CNOT device.

7. Source of Four Entangled Photons

Figure 8:
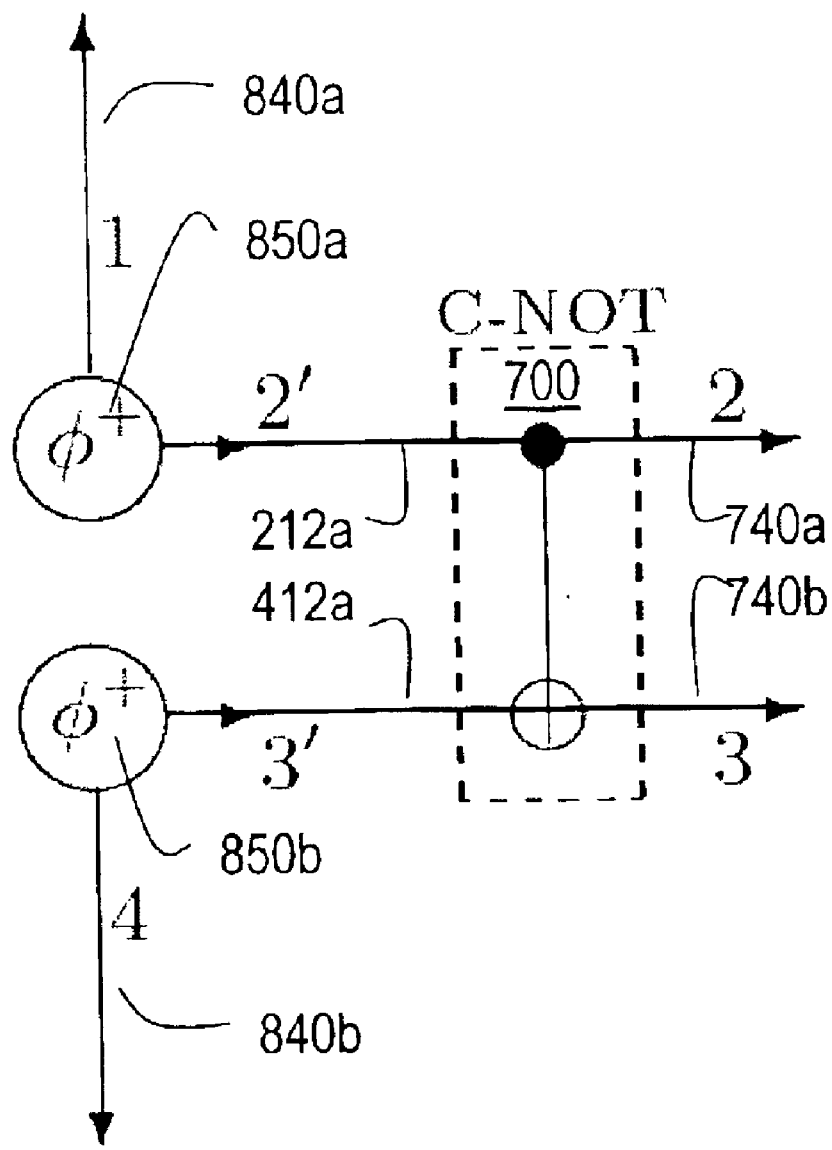
FIG. 8 is a block diagram that illustrates a source of four entangled photons, according to an embodiment.

A CNOT device requiring a 4 entangled photon source has been described by D. Gottesman and I. Chuang, *Nature*, vol. 402, p. 390, 1999 (hereinafter GC). The CNOT device 700 described above, using only a 2 entangled photon source, may be employed to generate the required 4 entangled photon source. FIG. 8 is a block diagram that illustrates a source 800 of four entangled photons, according to an embodiment.

The source 800 includes the nondestructive CNOT 700 and two additional sources 850a, 850b of two entangled photons. Each additional source 850a, 850b of two entangled photons has two output spatial modes. Source 850a has a first output spatial mode 840a (also labeled "1" in FIG. 8) and a second output spatial mode aligned with the control input mode 212a of CNOT 700 (also labeled "2'" in FIG. 8). Source 850b has a first output spatial mode 840b (also labeled "4" in FIG. 8) and a second output spatial mode aligned with the target input mode 412a of CNOT 700 (also labeled "3'" in FIG. 8). The four output modes of the source 800 then include output mode 840a of source 850a, output mode 840b of source 850b, control output mode 740a of CNOT 700 (also labeled "2" in FIG. 8), and output mode 740b of CNOT 700 (also labeled "3" in FIG. 8). This source produces four entangled photons with particular properties with a probability of ¼.

For the particular entangled photons state useful for the GC CNOT, each of sources 850a, 850b produces two photons in the entangled state given by Equation 8.

$$\Phi ij=(HiHj+ViVj)/\sqrt{2} \tag{8}$$

where i,j=1,2' or 3',4.

Given a reliable source of two entangled photon having a combined state that is also called a "Bell state", only four attempts are required, on average, to generate the particular state for the four entangled photons. In this sense, the CNOT 700 offers an accelerated source for preparing states for subsequent use in the Knill implementations.

8. Alternative Quantum Non-destructive CNOT device

Figure 9:
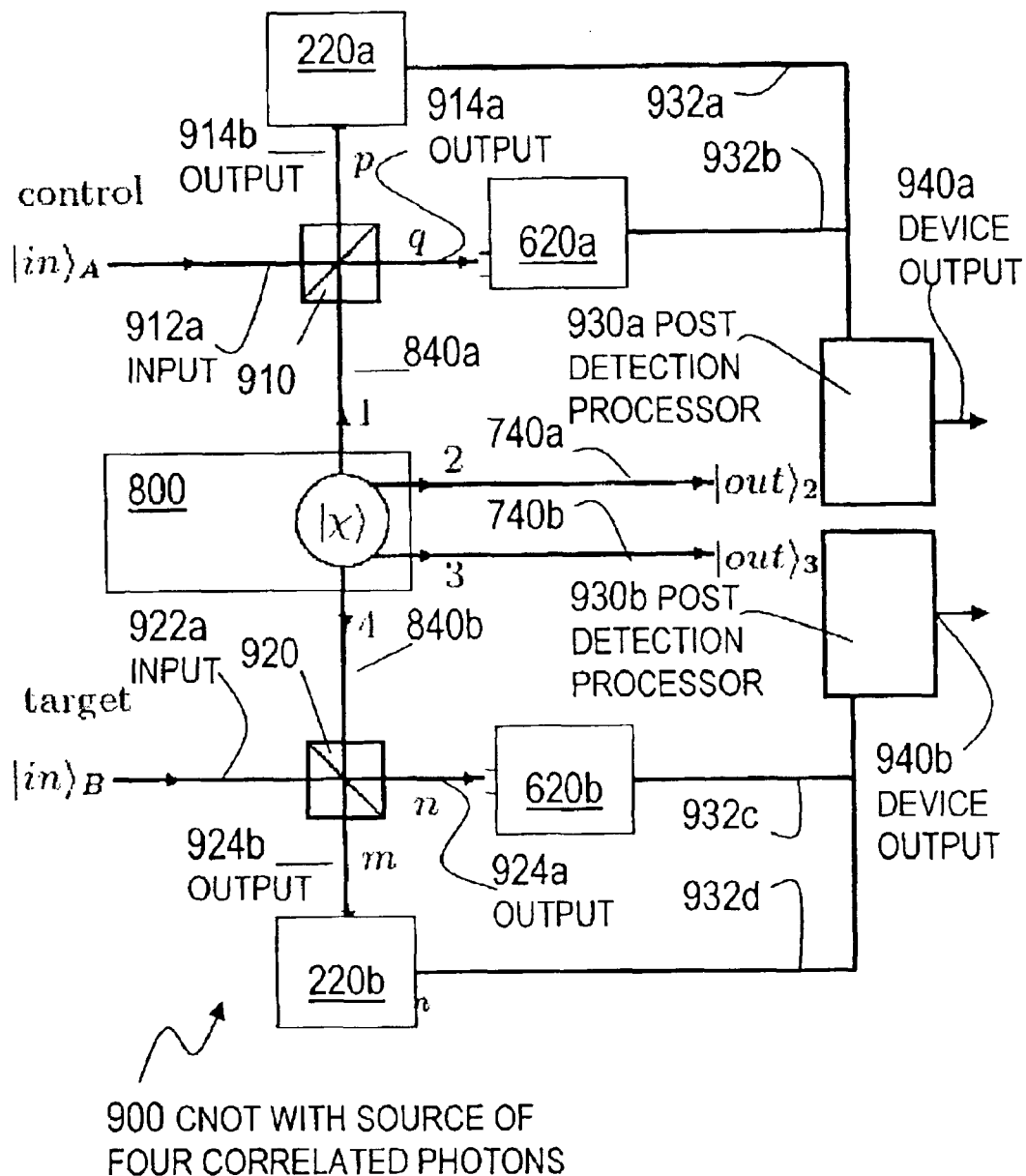
FIG. 9 is a block diagram that illustrates a quantum CNOT using four entangled photons, according to another embodiment.

FIG. 9 is a block diagram that illustrates a quantum CNOT 900 using four entangled photons, according to another embodiment. This implementation is similar to the GC CNOT but differs by including F-S PBSs in detectors 220a, 220b, 620a, 620b, as described below. The F-S PBSs erase H-V information in the detected photons and ensure that coherence is maintained for the photons operated upon by CNOT 900. No measurement of the control qubit value or the target qubit value is obtained.

The GC CNOT with a four entangled photon source does have some computational advantages over the CNOT 700 with a two entangled photon source. For example, the CG CNOT reliance on four ancilla photons overcomes certain problems associated with imperfect sources and photon loss. Furthermore, Knill has described a process in which the success probability of qubit teleportation (a transfer of state information over distance), required in protocols like the GC CNOT, can be increased arbitrarily close to 1 using more complex linear optics techniques. This allows the four entangled photon source to be produced probabilistically. Source 800 is just such a probabilistic source of four entangled photons.

8.1 Alternative Quantum CNOT Structural Overview

The alternative CNOT 900 includes the four entangled photons source 800 of FIG. 8 (also labeled χ in FIG. 9) as well as two H-V PBSs 910, 920. The H-V PBS 910 has two input spatial modes, a control input spatial mode 912*a* (also labeled mode "A" in FIG. 9) and a second input spatial mode aligned with output mode 840*a* of source 800 (also labeled mode "1" in FIG. 9 and FIG. 8). The H-V PBS 910 has two output spatial modes, output spatial mode 914*a* (also labeled "q" in FIG. 9) directed to detector Dq 620*a*, and output spatial mode 914*b* (also labeled "p" in FIG. 9) directed to detector Dp 220*a*. Data link 932*a* carries classical information about the photons detected in detector Dp 220*a* to post-detection processor 930*a*; and, data link 932*b* carries classical information about the photons detected in detector Dq 620*a* to post-detection processor 930*a*. Output mode 740*a* of source 800 (also labeled mode "2" in FIG. 9 and FIG. 8) is directed to post-detection processor 930*a*. The state of a photon on mode 740*a* is blocked, transformed or transferred unchanged to first device output 940*a* of the post-detection processor 930*a* based on the classical data received over links 932*a* or 932*b* or both.

The H-V PBS 920 has two input spatial modes, a target input spatial mode 922*a* (also labeled mode "B" in FIG. 9) and a second input spatial mode aligned with output mode 840*b* of source 800 (also labeled mode "4" in FIG. 9 and FIG. 8). The H-V PBS 920 has two output spatial modes, output spatial mode 924*a* (also labeled "n" in FIG. 9) directed to detector Dn 620*b*, and output spatial mode 924*b* (also labeled "m" in FIG. 9) directed to detector Dm 220*b*. Data link 932*d* carries classical information about the photons detected in detector Dm 220*b* to post-detection processor 930*b*; and, data link 932*c* carries classical information about the photons detected in detector Dn 620*b* to post-detection processor 930*b*. Output mode 740*b* of source 800 (also labeled mode "3" in FIG. 9 and FIG. 8) is directed to post-detection processor 930*b*. The state of a photon on mode 740*b* is blocked, transformed or transferred unchanged to second device output 940*b* of the post-detection processor 930*b* based on the data received over links 932*c* or 932*d* or both.

According to the illustrated embodiment, the detectors Dp 220*a* and Dm 220*b* are F-S polarization sensitive detectors as described above with reference to FIG. 2B, and the detectors Dq 620*a* and Dn 620*b* are F-S polarization sensitive detectors as described above with reference to FIG. 6B. The F-S PBSs in the F-S polarization sensitive detectors erase H-V information in the detected photons and ensure that coherence is maintained for the photons operated upon by CNOT 900. No measurement of the control qubit value or the target qubit value is obtained.

8.2 Alternative Quantum CNOT Operation

For arbitrary input photons A and B (control and target, respectively), the state $\Psi_{A,B}$ of the input is given by Equation 9a.

$$\Psi_{A,B}=(\alpha 1 H_A H_B + \alpha 2 H_A V_B + \alpha 3 V_A H_B + \alpha 4 V_A V_B) \quad (9a)$$

where the sum of the magnitudes squared of α1, α2, α3, α4 is 1. The desired output state $\Psi_{2,3}$ on modes "2" 740*a* and "3" 740*b* is given by Equation 9b.

$$\Psi_{2,3}=(\alpha 1 H_2 H_3 + \alpha 2 H_2 V_3 + \alpha 3 V_A V_3 + \alpha 4 V_2 H_3) \quad (9b)$$

The condition that 1AO1 photon be detected at each of the detectors Dp 220*a*, Dq 620*a*, Dm 220*b*, Dn 620*b* when the desired output is on modes "2" 740*a* and "3" 740*b* is satisfied if the entangled source 800 has the state χ given by Equation 9c.

$$\chi=\frac{1}{2}(H_1 H_4 H_2 H_3 + H_1 V_4 H_2 V_3 + V_1 H_4 V_A V_3 + V_1 V_4 V_2 H_3) \quad (9c)$$

This is the state produced by the source 800 as described above.

In the GC CNOT, the four detectors 220*a*, 220*b*, 620*a*, 620*b* are not F-S polarization sensitive detectors and only determine whether or not one photon is detected; and the outputs on modes 740*a*, 740*b* are blocked unless each detector detects only one photon. However, it is possible that the polarizations of output photons on modes 740*a*, 740*b* are entangled, i.e. are correlated, with the polarizations of the photons on the modes m 924*b*, n 924*a*, p 914*b*, q 914*a*. Any such entanglement would result in a more complicated final state $\Psi_{2,3}$ than shown in Equation 9b. This can be understood by considering that such entanglement would cause the detectors to provide information regarding the state of the control and target qubits, which would therefore decrease the coherence of the device. According to the illustrated embodiment 900, this entangled information is erased because each of the four detectors 220*a*, 220*b*, 620*a*, 620*b* measure the polarization of the photons in the F-S basis. As stated above, this erasure is demonstrated, for example, because a F polarized photon is an equal superposition of H and V polarized photons so that a measurement provides no information regarding the original values of the qubits.

With the four F-S polarization sensitive detectors, the alternative CNOT 900 succeeds with a probability of ¼, provided the source 800 provides four photons in the state χ given by Equation 9c.

9. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A logic device using quantum polarization states of single photons, comprising:
   a first polarizing beam splitter having a first plurality of input spatial modes and a first plurality of output spatial modes for a first set of orthogonal polarizations;
   a second polarizing beam splitter having a second input spatial mode and a second plurality of output spatial modes for a second set of orthogonal polarizations different from the first set, the second input spatial mode aligned with a first detected output spatial mode of the first plurality of output spatial modes;
   a first plurality of single photon detectors, each single photon detector disposed along a different one of the second plurality of output spatial modes; and
   a first device output that carries an output photon based in part on a number of photons detected by the first plurality of single photon detectors, wherein a polarizing beam splitter for a particular set of orthogonal polarizations transmits a photon that arrives on a particular input spatial mode with one polarization of the particular set onto one output spatial mode, and transmits a photon that arrives on the particular input spatial mode with a different polarization of the particular set onto a different output spatial mode.

2. The logic device as recited in claim 1, wherein the photon carried over the first device output is further based on a photon transmitted onto a transmitted output spatial mode of the first plurality of output spatial modes different from the detected output spatial mode.

3. The logic device as recited in claim 1, wherein, in response to receiving a single photon on each input spatial mode of the first plurality of input spatial modes, the first device output carries a photon only if the number of photons detected by the first plurality of single photon detectors equals one.

4. The logic device as recited in claim 3, wherein the photon carried by the first device output indicates that the single photons received on the first plurality of input spatial modes have similar polarization states.

5. The logic device as recited in claim 3, wherein no photon carried by the first device output indicates that the single photons received on the first plurality of input spatial modes have dissimilar polarization states.

6. The logic device as recited in claim 4, wherein the photon carried by the first device output has the same polarization state as a single photon received on the first plurality of input spatial modes, so that the logic device is a quantum parity check device.

7. The logic device as recited in claim 1, wherein the second set of orthogonal polarizations are rotated about 45 degrees with respect to the first set of orthogonal polarizations.

8. The logic device as recited in claim 7, wherein, when a single photon is detected in a first detector of the first plurality of single photon detectors, a photon on a transmitted output spatial mode of the first plurality of output spatial modes different from the detected output spatial mode is directed to the first device output.

9. The logic device as recited in claim 8, wherein,
the device further comprises a phase shifter to reverse a superposition amplitude of one polarization of the first set of orthogonal polarizations; and
when a single photon is detected in a second detector of the first plurality of single photon detectors different from the first detector, the photon on the transmitted output spatial mode is directed to an input of the phase shifter and an output of the phase shifter is directed to the first device output.

10. The logic device as recited in claim 3, wherein the photon carried by the first device output has an output polarization state that is one of a target polarization state of a target photon received on a target input mode of the first plurality of input modes and a flipped target polarization state in which amplitudes of the target polarization state with respect to the second set of orthogonal polarizations are swapped based on a polarization state with respect to the second set of a control photon received on a control input mode of the first plurality of input modes different from the target input mode, so that the logic device is a controlled not (CNOT) gate.

11. The logic device as recited in claim 10, wherein a photon with a polarization state that is the same as the control photon is not output from the device, so that the logic device is a CNOT gate that consumes the control photon.

12. The logic device as recited in claim 10, wherein the first set of orthogonal polarizations are rotated about 45 degrees with respect to the second set of orthogonal polarizations.

13. The logic device as recited in claim 10, wherein if the control photon has a polarization state aligned with a first polarization of the first set of orthogonal polarizations, then the control photon is transmitted to the detected output spatial mode.

14. The logic device as recited in claim 10, wherein, when a single photon is detected in a first detector of the first plurality of single photon detectors, a photon on a transmitted output spatial mode of the first plurality of output spatial modes different from the detected output spatial mode is directed to the first device output.

15. The logic device as recited in claim 14, wherein,
the device further comprises a classical transformation component to deterministically transform a photon's state; and
when a single photon is detected in a second detector of the first plurality of single photon detectors different from the first detector, the photon on the transmitted output spatial mode is directed to an input of the classical transformation component and an output of the classical transformation component is directed to the first device output.

16. The logic device as recited in claim 15, the classical transformation component comprising:
a polarization rotating element; and
a phase shifter to reverse a superposition amplitude of one polarization of the second set of orthogonal polarizations.

17. The logic device as recited in claim 1, wherein:
the logic device further comprises a source of two entangled photons with correlated polarizations, which entangled photons are directed onto two respective source spatial modes; and
a first source mode of the source spatial modes is directed to a first input mode of the first plurality of input spatial modes of the first polarizing beam splitter.

18. The logic device as recited in claim 17, further comprising:
a third polarizing beam splitter having a third input spatial mode and a third plurality of output spatial modes for the second set of orthogonal polarizations, the third input spatial mode aligned with a second detected output spatial mode of the first plurality of output spatial modes different from the detected output spatial mode; and
a second plurality of single photon detectors, each single photon detector of the second plurality of single photon detectors disposed along one of the third plurality of output spatial modes.

19. The logic device as recited in claim 18, wherein, in response to receiving a single photon on a second input spatial mode of the first plurality of input spatial modes different from the first input mode, the first device output carries a photon only if the number of photons detected by the first plurality of single photon detectors equals one and a number of photons detected by the second plurality of single photon detectors equals one.

20. The logic device as recited in claim 19, wherein the photon carried by the first device output has the same polarization state as the single photon received on the second input mode, so that the logic device serves as a quantum relay.

21. The logic device as recited in claim 20, further comprising a classical output signal that indicates when the number of photons detected by the first plurality of single photon detectors equals one and the number of photons detected by the second plurality of single photon detectors equals one.

22. The logic device as recited in claim 21, wherein the device is disposed on an optical communications channel between a transmitter of qubits represented by quantum polarization states of single photons and a receiver for the qubits.

23. The logic device as recited in claim 22, wherein the receiver discounts a qubit detected when the classical output signal indicates the number of photons detected by the first plurality of single photon detectors does not equal one or the number of photons detected by the second plurality of single photon detectors does not equal one.

24. The logic device as recited in claim 17, wherein:
   the logic device further comprises a second device output different from the first device output; and
   a photon carried on the second device output is based on a photon carried on a different second source mode of the source spatial modes.

25. The logic device as recited in claim 24, wherein, in response to receiving a single photon on a second input spatial mode of the first plurality of input spatial modes different from the first input mode:
   the first device output carries a photon only if the number of photons detected by the plurality of single photon detectors equals one; and
   the second device output carries a photon only if the number of photons detected by the plurality of single photon detectors equals one.

26. The logic device as recited in claim 25, wherein the photon carried by the second device output and the photon carried by the first device output have the same polarization state as the single photon received on the second input mode, so that the logic device is a quantum encoder.

27. The logic device as recited in claim 24, wherein the second set of orthogonal polarizations are rotated about 45 degrees with respect to the first set of orthogonal polarizations.

28. The logic device as recited in claim 17, further comprising:
   a third polarizing beam splitter having a second plurality of input spatial modes and a third plurality of output spatial modes for the second set of orthogonal polarizations, a third input spatial mode of the third plurality of input spatial modes aligned with a second source mode of the two source spatial modes different from the first source spatial mode;
   a fourth polarizing beam splitter having a fourth input spatial mode and a fourth plurality of output spatial modes for the first set of orthogonal polarizations, the fourth input spatial mode aligned with a second detected output spatial mode of the third plurality of output spatial modes; and
   a second plurality of single photon detectors, each single photon detector of the second plurality of single photon detectors dispose along one of the fourth plurality of output spatial modes.

29. The logic device as recited in claim 28, wherein, in response to receiving a single target photon on a target input mode of the second plurality of input spatial modes of the third polarizing beam splitter different from the third input mode, the second device output carries a photon only if the number of photons detected by the second plurality of single photon detectors equals one.

30. The logic device as recited in claim 29, wherein, in response to receiving a single control photon on a control input mode of the first plurality of input spatial modes different from the first input mode, the first device output carries a photon only if the number of photons detected by the first plurality of single photon detectors equals one.

31. The logic device as recited in claim 30, wherein a photon carried by the second device output has an output polarization state that is one of a target polarization state of the target photon and a flipped target polarization state in which amplitudes of the target polarization state with respect to the first set of orthogonal polarizations are swapped based on a polarization state of the control photon with respect to the first set, so that the logic device is a controlled not (CNOT) gate.

32. The logic device as recited in claim 31, wherein a photon carried by the first device output has an output polarization state that is the same as the control photon, so that the logic device is a CNOT gate that does not consume the control photon.

33. The logic device as recited in claim 28, wherein the second set of orthogonal polarizations are rotated about 45 degrees with respect to the first set of orthogonal polarizations.

34. The logic device as recited in claim 28, wherein:
   the logic device further comprises a plurality of additional sources of two entangled photons having correlated polarization states, each additional source directing two entangled photons onto two respective additional source spatial modes;
   a first additional source mode of a first additional source of the plurality of additional sources is directed to a control input mode, different from first the input mode, of the first plurality of input spatial modes of the first polarizing beam splitter; and
   a second additional source mode of a different second additional source of the plurality of additional sources is directed to a target input spatial mode of the second plurality of input spatial modes of the third polarizing beam splitter.

35. The logic device as recited in claim 34, wherein:
   the logic device further comprises a second device output that carries a photon based in part on a number of photons detected by the second plurality of photon detectors; and
   a plurality of single photons carried by the first device output and the second device output and a third additional source mode of the first additional source, different from first additional source mode, and a fourth additional source mode of the second additional source, different from third additional source mode, have correlated polarization states.

36. A method for performing logical operations on quantum polarization states of single photons, comprising the steps of:
   sending a first plurality of input spatial modes into a first polarizing beam splitter for a first set of orthogonal polarizations to generate a first plurality of output spatial modes;
   sending a first detected output spatial mode of the first plurality of output spatial modes into a second polarizing beam splitter for a second set of orthogonal polarizations different from the first set to generate a second plurality of output spatial modes;

sending the second plurality of output spatial modes into a first plurality of single photon detectors, each output spatial mode sent to a respective one of the single photon detectors; and generating a first device output that carries an output photon based in part on a number of photons detected by the first plurality of single photon detectors, wherein a polarizing beam splitter for a particular set of orthogonal polarizations transmits a photon that arrives on a particular input spatial mode with one polarization of the particular set onto one output spatial mode, and transmits a photon that arrives on the particular input spatial mode with a different polarization of the particular set onto a different output spatial mode.

37. A method of fabricating a logic device using quantum polarization states of single photons, comprising:

connecting a first detected output spatial mode of a first plurality of output spatial modes of a first polarizing beam splitter for a first set of orthogonal polarizations, the first polarizing beam splitter having a first plurality of input spatial modes, to a second input mode of a second polarizing beam splitter for a second set of orthogonal polarizations different from the first set, the second polarizing beam splitter having a second plurality of output spatial modes;

connecting a plurality of single photon detectors to the second plurality of output spatial modes, each single photon detector disposed along one of the second plurality of output spatial modes and having a detection output for carrying a detection signal; and connecting a transmitted output spatial mode of the first plurality of output spatial modes and the detection outputs from the plurality of single photon detectors to a component that produces an output photon on a device output spatial mode based in part on a number of photons detected by the plurality of single photon detectors, the transmitted output spatial mode different from the detected output spatial mode, wherein a polarizing beam splitter for a particular set of orthogonal polarizations transmits a photon that arrives on a particular input spatial mode with one polarization of the particular set onto one output spatial mode, and transmits a photon that arrives on the particular input spatial mode with a different polarization of the particular set onto a different output spatial mode.

* * * * *